US010439453B2

United States Patent
Hattori

(10) Patent No.: US 10,439,453 B2
(45) Date of Patent: Oct. 8, 2019

(54) STATOR

(71) Applicant: TOYOTA JIDOSHA KABUSHIKI KAISHA, Toyota-shi, Aichi-ken (JP)

(72) Inventor: Hiroyuki Hattori, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 374 days.

(21) Appl. No.: 15/399,296

(22) Filed: Jan. 5, 2017

(65) Prior Publication Data

US 2017/0201133 A1    Jul. 13, 2017

(30) Foreign Application Priority Data

Jan. 13, 2016  (JP) ................................ 2016-004184

(51) Int. Cl.
| | | |
|---|---|---|
| H02K 3/18 | (2006.01) | |
| H02K 1/04 | (2006.01) | |
| H02K 1/14 | (2006.01) | |
| H02K 1/16 | (2006.01) | |
| H02K 3/38 | (2006.01) | |
| H02K 3/34 | (2006.01) | |

(52) U.S. Cl.
CPC .............. *H02K 1/04* (2013.01); *H02K 1/146* (2013.01); *H02K 1/16* (2013.01); *H02K 1/165* (2013.01); *H02K 3/18* (2013.01); *H02K 3/38* (2013.01); *H02K 3/345* (2013.01)

(58) Field of Classification Search
CPC ............ H02K 3/38; H02K 3/18; H02K 3/345; H02K 1/04; H02K 1/165; H02K 1/16; H02K 1/145–146; H02K 1/10; H02K 1/14; H02K 1/18; H02K 1/185; H02K 3/34; H02K 3/46
USPC ............................ 310/215, 216, 16, 216.019
See application file for complete search history.

(56) References Cited

U.S. PATENT DOCUMENTS

| | | | | |
|---|---|---|---|---|
| 6,414,413 | B1 * | 7/2002 | Arai ..................... | H02K 1/146 |
| | | | | 29/596 |
| 2012/0153767 | A1 * | 6/2012 | Tang ..................... | H02K 3/345 |
| | | | | 310/215 |

FOREIGN PATENT DOCUMENTS

| | | |
|---|---|---|
| JP | 10-322951 A | 12/1998 |
| JP | 2003-299289 A | 10/2003 |
| JP | 2007-312549 A | 11/2007 |
| JP | 2014-135865 A | 7/2014 |
| JP | 2015-154497 A | 8/2015 |

* cited by examiner

*Primary Examiner* — Nguyen Tran
*Assistant Examiner* — Bryan R Perez
(74) *Attorney, Agent, or Firm* — Sughrue Mion, PLLC

(57) ABSTRACT

A stator includes a stator core has slots that are each provided between stator teeth disposed on the stator core. The insulation paper is disposed in the slot between the coil and the stator core defining the slot has a recess at a position adjacent to connection parts between side walls and a bottom wall of the insulation paper. The recess extends so as to be apart from the connection parts in one of a radial direction and the circumferential direction. The insulation members include a projection that is configured to be disposed inside the recess.

2 Claims, 22 Drawing Sheets

STATOR

INCORPORATION BY REFERENCE

The disclosure of Japanese Patent Application No. 2016-004184 filed on Jan. 13, 2016 including the specification, drawings and abstract is incorporated herein by reference in its entirety.

BACKGROUND

1. Technical Field

The present disclosure relates to a stator, and more particularly to a rotating electrical machine with insulation paper inserted in slots.

2. Description of Related Art

Japanese Patent Application Publications No. 2007-312549 and No. 2003-299289 disclose stators including an insulating cuff support that secures insulation between the coil and the stator core.

For example, the stator described in Japanese Patent Application Publication No. 2014-135865 includes a stator core with a plurality of stator teeth formed on the inner peripheral surface, an annular cuff support provided on an end face of the stator core, and insulation paper inserted in slots each formed between the stator teeth. A coil is arranged in the slots.

In the stator described in JP 2014-135865 A, the ends of the insulation paper are held between the cuff support and the stator core. In the step of winding the coil through the slot, the cuff support may move slightly as an external force is applied to the cuff support. Then, the portion of the insulation paper held between the cuff support and the stator core may tear. If the insulation paper tears, the stator core is exposed through the insulation paper, and it becomes difficult to secure insulation between the coil and the stator core.

SUMMARY

The present disclosure provides a stator in which insulation between the stator core and the coil is secured.

According to one aspect of the disclosure, a stator includes a stator core, insulation members, a coil, and insulation paper. The stator core includes a yoke that extends annularly, and a plurality of stator teeth that is arranged on a peripheral surface of the yoke at intervals in a circumferential direction of the yoke. The stator core is annular and having slots. The slots are each provided between the stator teeth adjacent to each other in the circumferential direction of the stator core. The insulation members are disposed on the stator teeth in one end face of a pair of end faces of the stator core. The pair of end faces is aligned with each other in a thickness direction of the stator core. The coil is disposed in the slots. The coil protrudes to the outside of the stator core through an opening of the slot located in the one end face. The insulation paper is disposed in the slot between the coil and the stator core. The insulation paper includes side walls extending along the stator teeth, and a bottom wall. The bottom wall extends along the peripheral surface of the yoke and is connected to the side walls. The insulation paper is provided so as to protrude through the opening of the slot. The internal surface of the stator core defining the slot has a recess at a position adjacent to connection parts between the side walls and the bottom wall of the insulation paper. The internal surface of the stator core defining the recess is apart from the connection parts. The recess extends from the one end face in the thickness direction. The insulation members include a projection that is configured to be disposed inside the recess.

In the above stator, when the coil is wound around the stator teeth, the protruding portions of the side walls of the insulation paper that protrude through the opening of the slot are pressed by the coil in the circumferential direction. When pressed in the circumferential direction, the protruding portions deform along the surface of the insulation member disposed on the stator teeth. On the other hand, the bottom wall of the insulation paper is formed so as to extend in the circumferential direction, and does not easily deform in the circumferential direction.

Accordingly, in the connection parts between the side walls and the bottom wall, the ends of the connection parts are likely to tear. When the end of the connection part tears, first, the upper surface of the insulation member is exposed. At the point when the upper surface of the insulation member is exposed, insulation between the stator core and the coil is still secured.

The tear having occurred at the end of the connection part may grow and reach the slot. However, the recess is formed in the stator core at a position adjacent to the connection parts, and the projection of the insulation member is disposed inside the recess.

Accordingly, even if the tear of the insulation paper reaches the slot, the projection of the insulation member is exposed through the insulation paper, so that the exposure of the stator core through the insulation paper is prevented. As a result, insulation between the stator core and the coil can be secured.

According to the above mentioned aspect, the side walls may include a first side wall extending along one of two stator teeth that are adjacent to each other in the circumferential direction, and a second side wall extending along the other of the stator teeth. The connection parts may include a first connection part connecting the first side wall and the bottom wall to each other, and a second connection part connecting the second side wall and the bottom wall to each other. The recess may be provided so as to: extend from a first adjacent position adjacent to the first side wall; pass through a position adjacent to the first connection part and a position adjacent to the second connection part; and reach a second adjacent position adjacent to the second side wall. The projection may be configured to extend from the first adjacent position to the second adjacent position.

In the above stator, the recess and the projection are formed so as to extend from the first adjacent position adjacent to the first side wall, pass through the position adjacent to the first connection part and the position adjacent to the second connection part, and reach the second adjacent position adjacent to the second side wall. Accordingly, even if the insulation paper tears in the first connection part and the surrounding area or in the second connection part and the surrounding area, the projection is exposed and the exposure of the stator core is prevented.

According to the above mentioned aspects, the stator teeth each may further include tip recesses that are provided on a radially inner side of the stator core than the recess. The insulation members may include tip projections so as to be disposed inside the tip recesses. [0015] In the above stator, the insulation member is engaged with the stator core by the projection disposed inside the recess and the tip projections disposed inside the tip recesses. Thus, it is possible to prevent the displacement of the insulation member from the end face of the stator core.

According to the stator of the present disclosure, insulation between the stator core and the coil can be secured.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
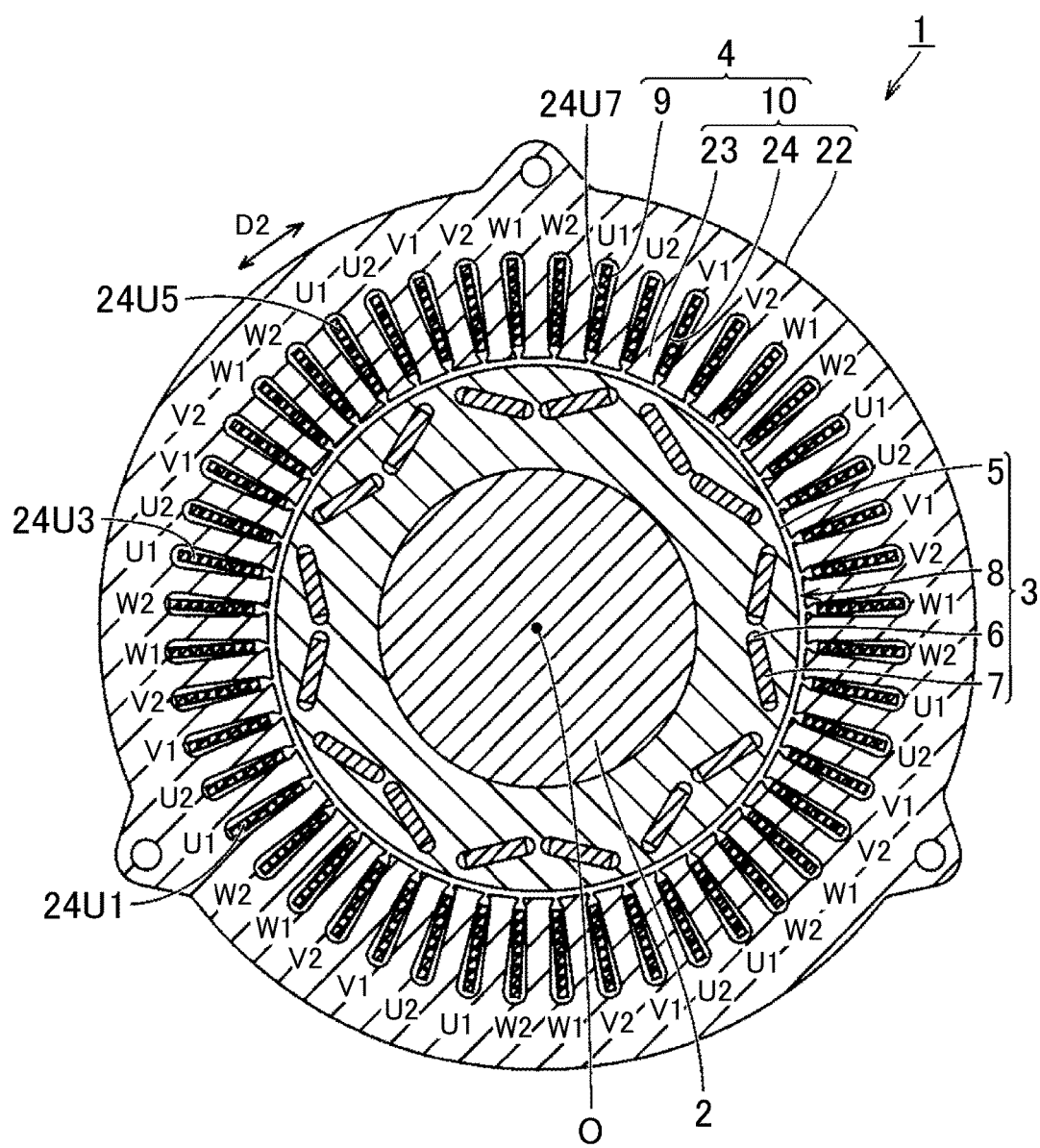
FIG. 1 is a sectional view showing a rotating electrical machine including a stator according to the first embodiment.

FIG. 1 is a sectional view showing a rotating electrical machine including a stator according to the first embodiment. As shown in FIG. 1, the rotating electrical machine 1 includes a rotating shaft 2 that rotates around a rotation centerline O, a rotor 3 fixed on an outer peripheral surface of the rotating shaft 2, and a stator 4 formed so as to surround the rotor 3.

The rotor 3 includes a cylindrical rotor core 5, and permanent magnets 7 inserted in magnet insert holes 6 formed in the rotor core 5. One magnetic pole 8 is formed by a pair of permanent magnets 7 disposed in the shape of the letter V, and eight magnetic poles are formed in the rotor 3 in the example shown in FIG. 1.

The stator 4 includes a stator core 10 having an annular shape, and a stator coil 9 arranged in the stator core 10.

Figure 2:
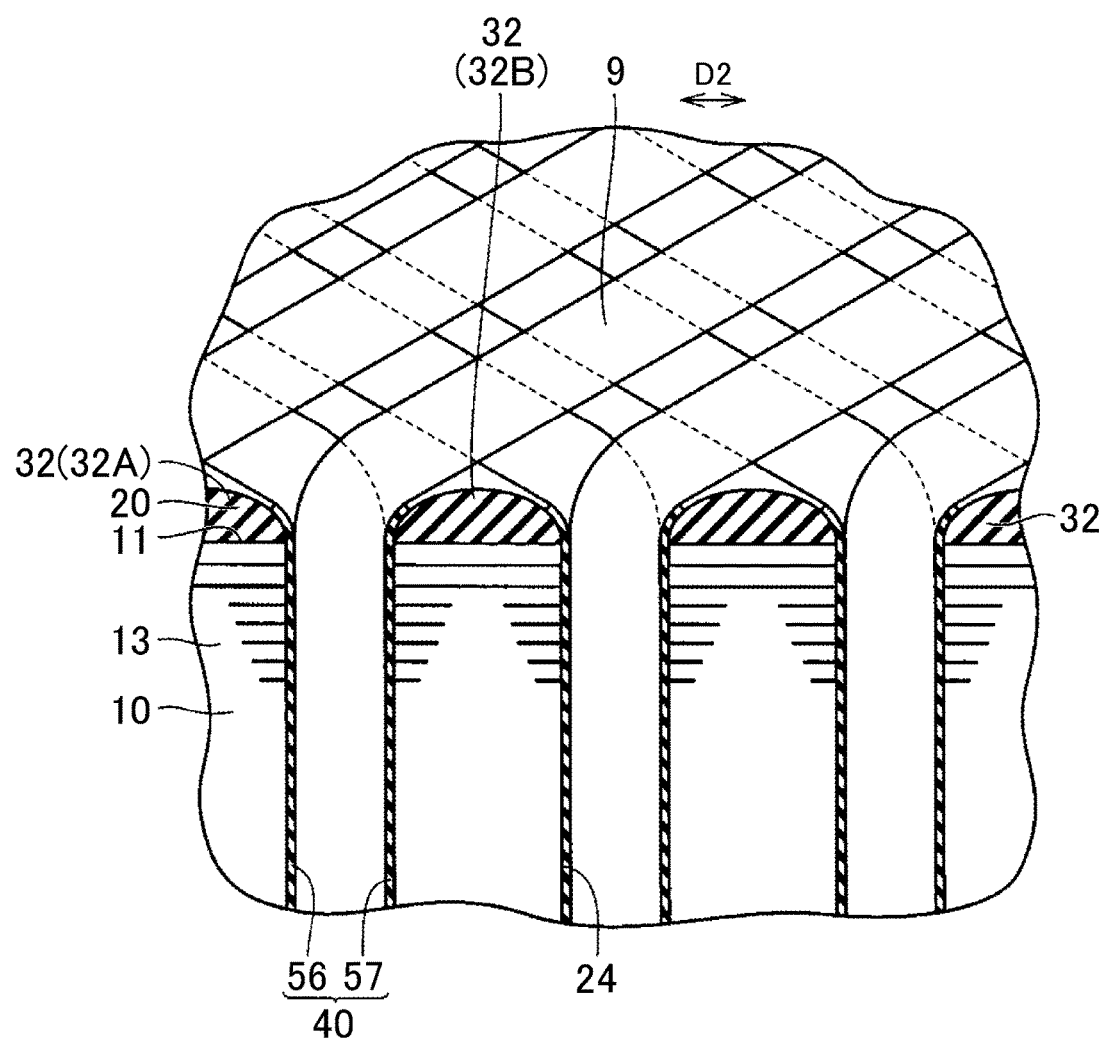
FIG. 2 is a development of a part of an inner peripheral surface of a stator 4.

The stator core 10 includes a yoke 22 having an annular shape, and a plurality of stator teeth 23 formed at intervals on an inner peripheral surface of the yoke 22. Slots 24 are each formed between the stator teeth 23 adjacent to each other in a circumferential direction D2 of the yoke 22. FIG. 2 is a development of a part of an inner peripheral surface of the stator 4. The stator core 10 is formed, for example, by stacking a plurality of laminated steel plates 13. As shown in FIG. 2, a part of the stator coil 9 is inserted in the slots 24.

As shown in FIG. 1, the stator coil 9 includes two U-phase coils U1, U2 connected in parallel to each other, two V-phase coils V1, V2 connected in parallel to each other, and two W-phase coils W1, W2 connected in parallel to each other. There are 48 slots 24 formed in the stator core 10.

For example, the U-phase coil U1 is inserted into a slot 24U1 and a slot 24U3, and is wound multiple times between the slot 24U1 and the slot 24U3. After being wound a predetermined number of times, the U-phase coil U1 is pulled out into a slot 24U5. Then, U-phase coil U1 is wound multiple times between the slot 24U5 and a slot 24U7. Thereafter, the U-phase coil U1 is pulled out into a distant slot and wound in the same manner so as to run around the stator core 10. The U-phase coil U2, the V-phase coils V1, V2, and the W-phase coils W1, W2 are formed in the same manner. Thus, the stator 4 of the first embodiment is a distributed-winding motor.

Figure 3:
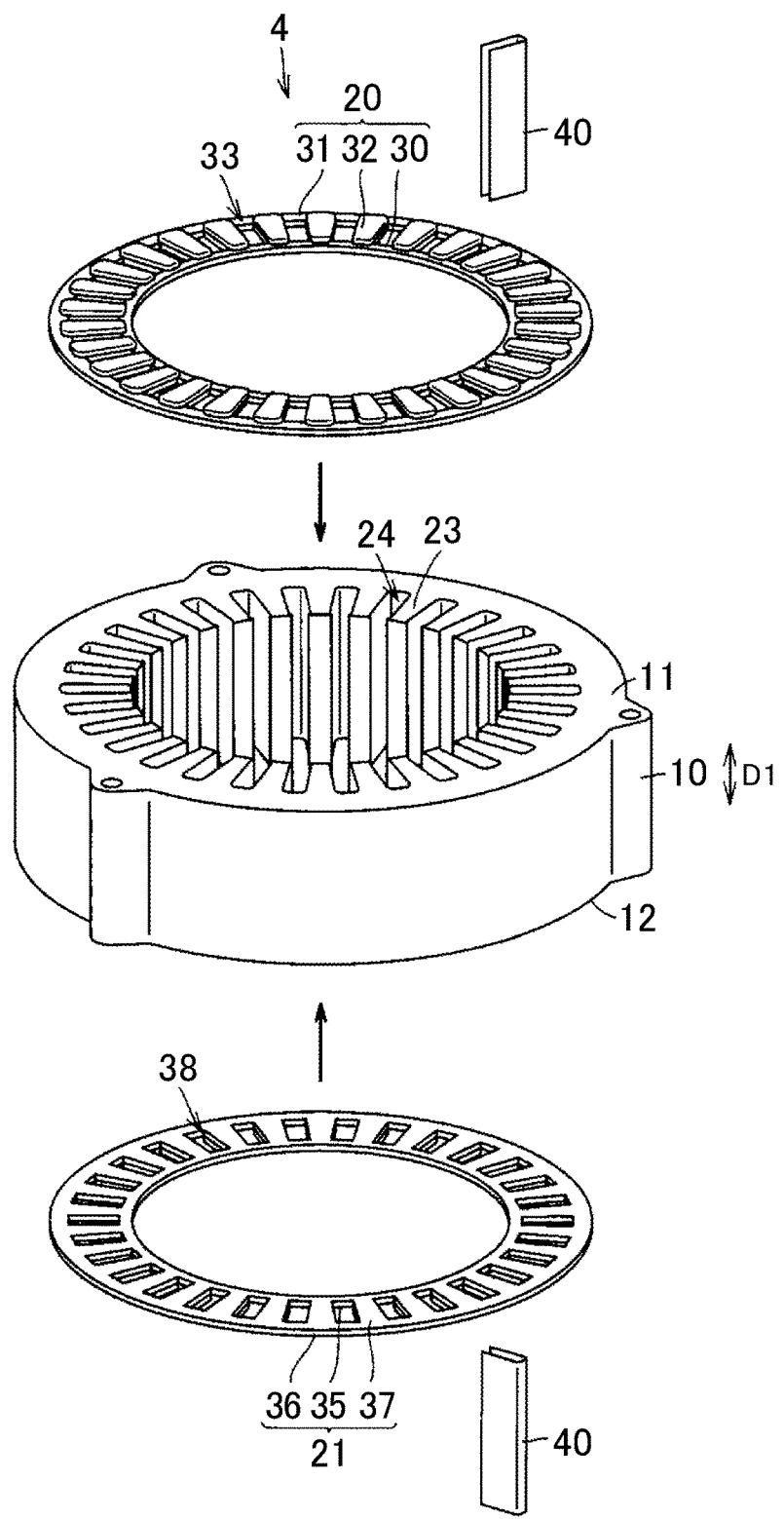
FIG. 3 is an exploded perspective view showing the stator 4.

FIG. 3 is an exploded perspective view showing the stator 4. The coil is not shown in FIG. 3. As shown in FIG. 3, the stator 4 includes a cuff support (insulation member) 20 disposed on an end face 11 of the stator core 10, a cuff support (insulation member) 21 disposed on an end face 12 of the stator core 10, and insulation paper 40.

The end face 11 and the end face 12 of the stator core 10 are aligned with each other in a thickness direction D1 of the stator core 10, and the slots 24 are formed from the end face 11 to the end face 12.

The cuff supports 20, 21 are formed of an insulation material, such as a resin. The cuff support 20 includes an inner frame 30 having an annular shape, an outer frame 31 formed so as to surround the outer periphery of the inner frame 30, and a plurality of covers 32 formed so as to connect the inner frame 30 and the outer frame 31 to each other.

The outer frame 31 has a larger diameter than the inner frame 30. The covers 32 are disposed at intervals in the circumferential direction of the inner frame 30 and the outer frame 31. Communication holes 33 communicating with the slots 24 are each formed between adjacent covers 32. On the side of the end face 11, the covers 32 are disposed on the stator teeth 23 of the stator core 10.

The cuff support 21 is formed in the same manner as the cuff support 20. The cuff support 21 includes an inner frame 35 extending annularly, an annular outer frame 36 disposed on the outer side of the inner frame 35, and covers 37 connecting the inner frame 35 and the outer frame 36 to each other. The covers 37 are disposed at intervals in the circumferential direction of the inner frame 35 and the outer frame 36. Communication holes 38 are each formed between the covers 37 adjacent to each other in the circumferential direction. On the side of the end face 12, the covers 37 are disposed on the stator teeth 23.

Figure 4:
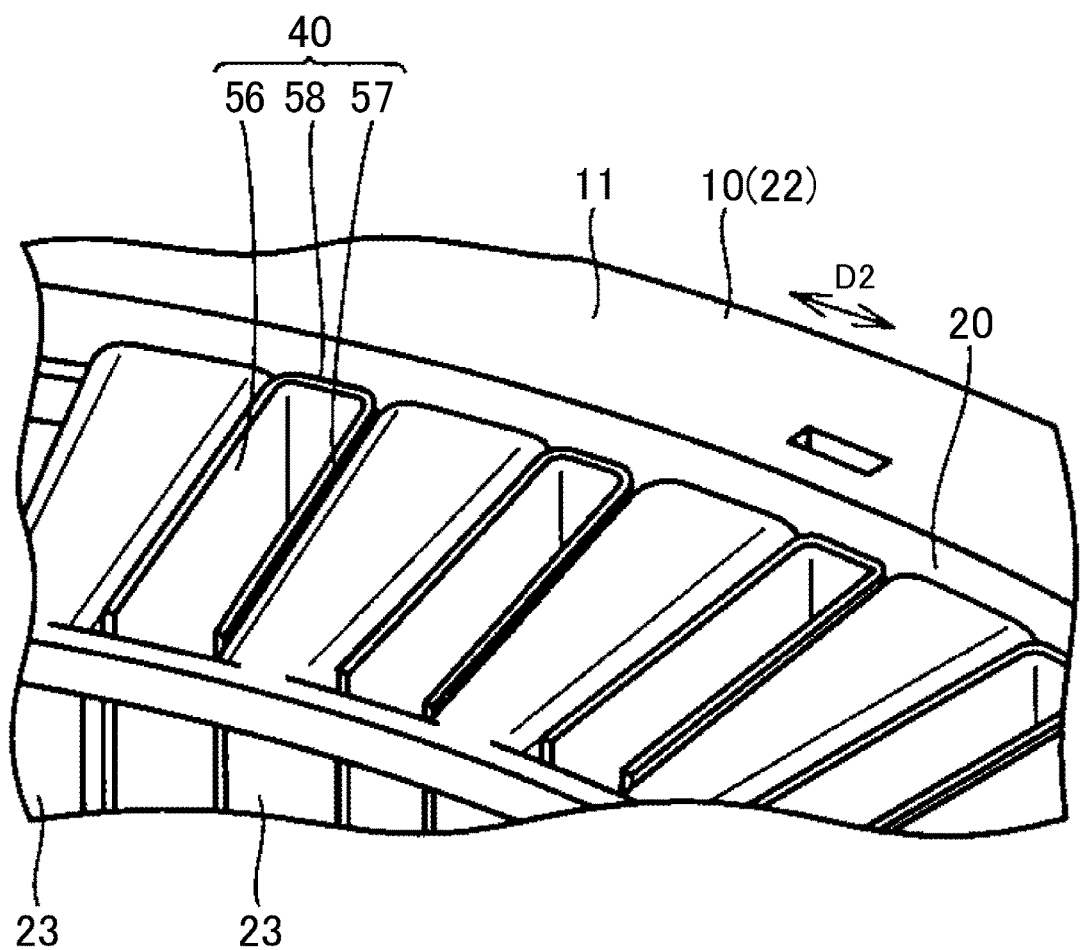
FIG. 4 is a perspective view showing a part of insulation paper 40, a cuff support 20, and a stator core 10.
Figure 5:
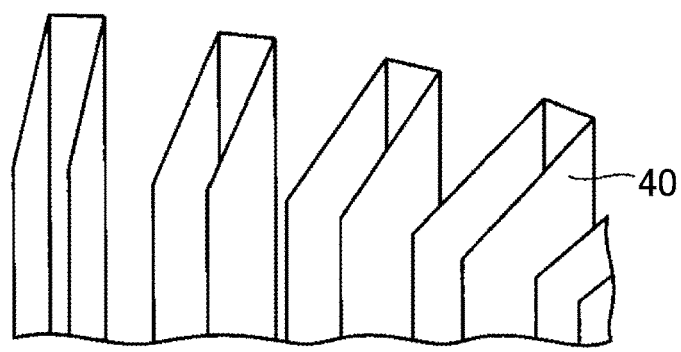
FIG. 5 is an exploded perspective view showing the stator core 10, the cuff support 20, and the insulation paper 40.
Figure 5:
Figure 5:
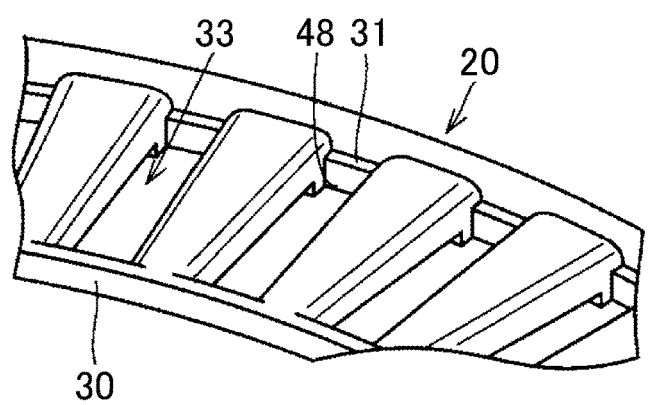
Figure 5:
Figure 5:
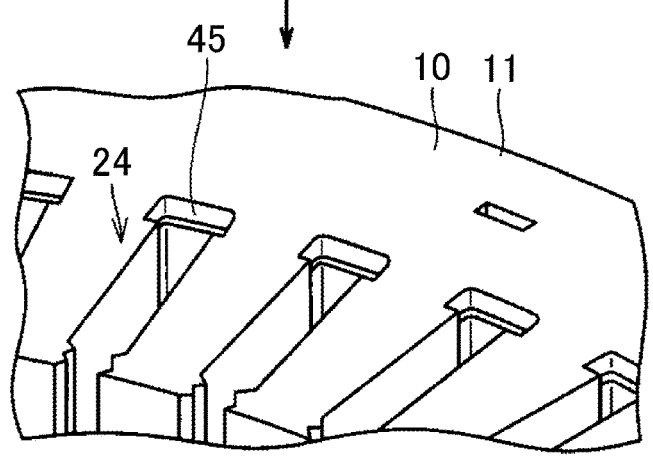

FIG. 4 is a perspective view showing a part of the insulation paper 40, the cuff support 20, and the stator core 10, and FIG. 5 is an exploded perspective view showing the stator core 10, the cuff support 20, and the insulation paper 40. In FIG. 4 and FIG. 5, the stator coil 9 is omitted. As shown in FIG. 4, the insulation paper 40 is inserted in the slot 24 and the communication hole 33 of the cuff support 20. The insulation paper 40 includes a pair of side walls 56, 57 extending along a pair of stator teeth 23 adjacent to each other in the circumferential direction D2, and a bottom wall 58 connecting the side wall 56 and the side wall 57 to each other. The bottom wall 58 is disposed so as to extend in the circumferential direction D2 of the yoke 22. The side wall 56 is one example of the first side wall, and the side wall 57 is one example of the second side wall.

As shown in FIG. 5, the slots 24 are formed so as to open in the end face 11 of the stator core 10. As shown in FIG. 2, the stator coil 9 is formed so as to pass through the slots 24 and protrude to the outside through the openings of the slots 24 formed in the end face 11 of the stator core 10. The stator coil 9 is bent along the upper surfaces of the covers 32 disposed on the end face 11. The insulation paper 40 is disposed inside the slots 24, between the stator core 10 and the stator coil 9. The insulation paper 40 is formed so as to protrude through the openings of the slots 24 located in the end face 11.

The side wall 56 and the side wall 57 are formed such that the interval therebetween in the circumferential direction D2 increases as these walls extend away from the opening of the slot 24. A portion of the side wall 56 protruding through the opening of the slot 24 is bent along the upper surface of a cover 32A. A portion of the side wall 57 protruding through the opening of the slot 24 is bent along the upper surface of a cover 32B.

Figure 6:
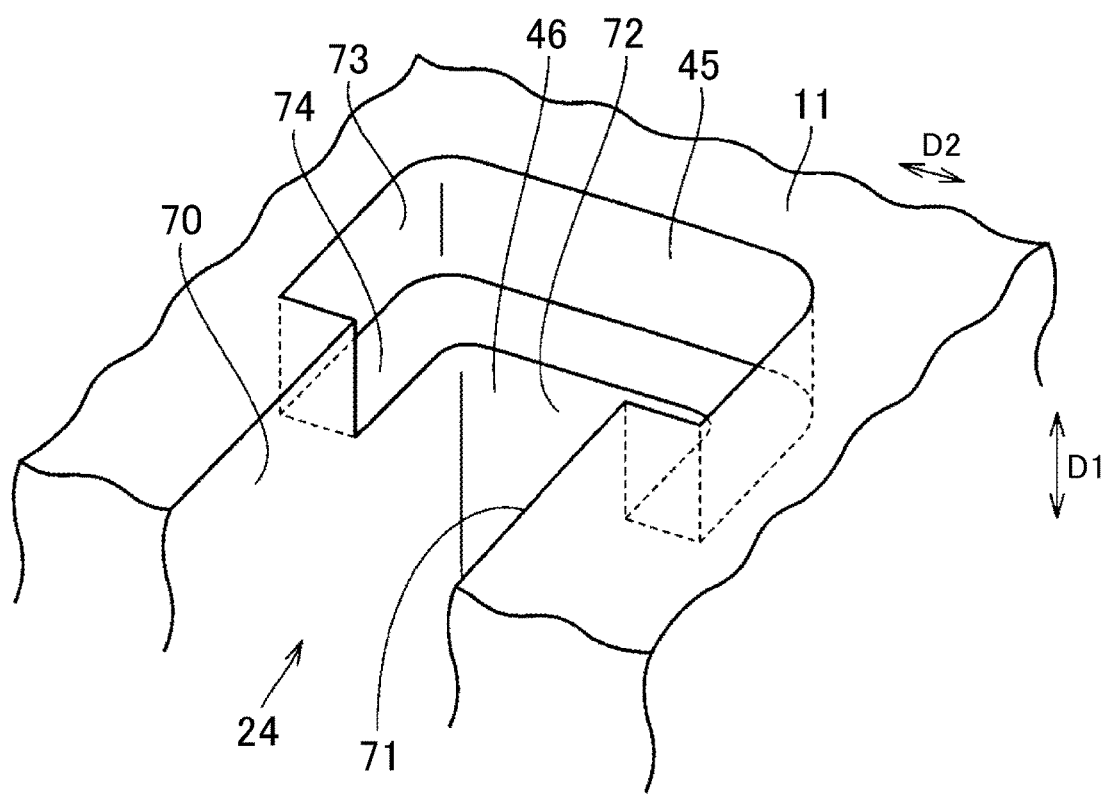
FIG. 6 is a perspective view showing an opening of a slot 24 and the surrounding structure.

FIG. 6 is a perspective view showing the opening of the slot 24 and the surrounding structure. As shown in FIG. 6, the stator core 10 has a slot main hole 46 forming a major part of the slot 24, and a recess 45 formed so as to increase the open area of the slot 24. An internal surface of the stator core 10 defining the slot main hole 46 includes a pair of inner surfaces 70, 71 facing each other in the circumferential direction D2, and a bottom surface 72 extending in the circumferential direction D2.

For example, the depth of the recess 45 in the thickness direction D1 is equivalent to the thickness of several laminated steel plates. An internal surface of the recess 45 includes an inner peripheral surface 73 extending from the end face 11 in the thickness direction D1, and a bottom surface 74 extending along the edge of the slot main hole 46.

Figure 7:
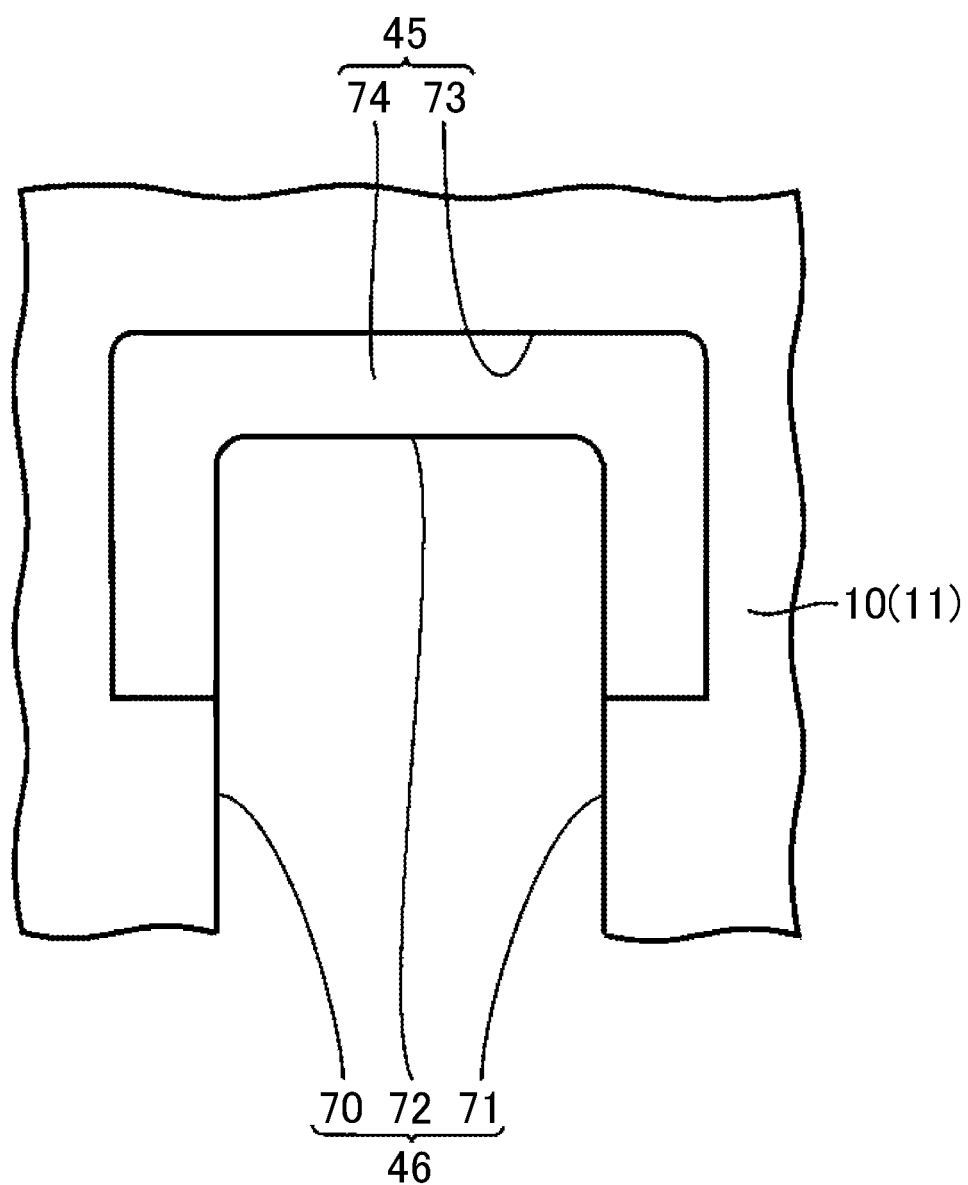
FIG. 7 is a plan view showing a recess 45.

As shown in FIG. 7, when the stator core 10 is seen in a plan view from a position away from the end face 11, the recess 45 is formed so as to surround the end of the slot main hole 46 located on the radially outer side.

Figure 8:
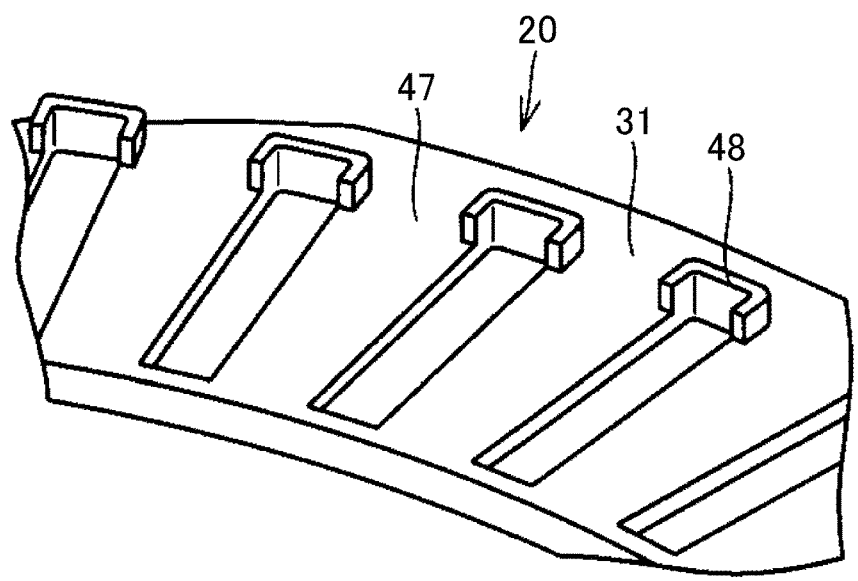
FIG. 8 is a perspective view showing, of the surfaces of the cuff support 20, a mounting surface 47 to be mounted on an end face 11.

FIG. 8 is a perspective view showing, of the surfaces of the cuff support 20, a mounting surface 47 to be mounted on the end face 11. As shown in FIG. 8, a plurality of projections 48 is formed on the outer frame 31 of the cuff support 20. The projections 48 are disposed inside the recesses 45 shown in FIG. 7.

Figure 9:
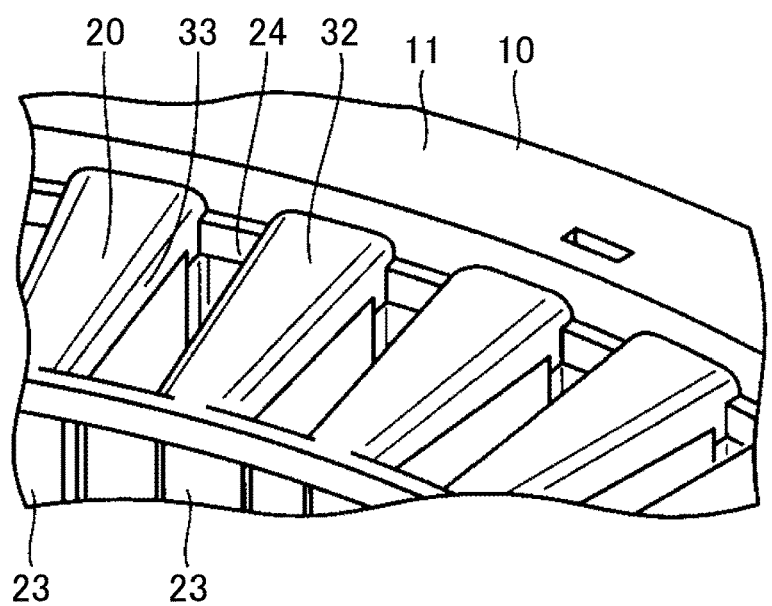
FIG. 9 is a perspective view showing the cuff support 20 as mounted on the end face 11.
Figure 10:
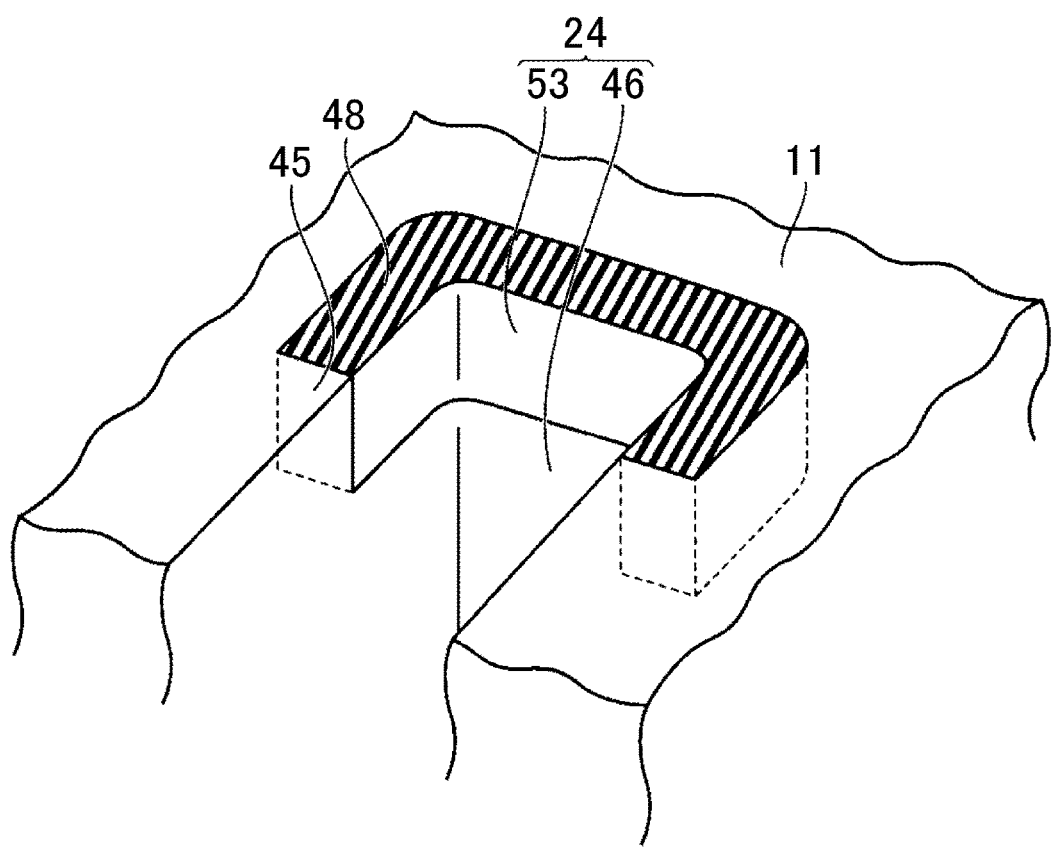
FIG. 10 is a sectional perspective view showing a projection 48 and the surrounding structure in the state shown in FIG. 9.

FIG. 9 is a perspective view showing the cuff support 20 as mounted on the end face 11. FIG. 10 is a sectional perspective view showing the projection 48 and the surrounding structure in the state shown in FIG. 9. In FIG. 9, the covers 32 are disposed on the upper surfaces of the stator teeth 23, and the cuff support 20 is disposed such that the communication holes 33 communicate with the slots 24.

As shown in FIG. 10, when the cover 32 is disposed on the upper surface of the stator tooth 23, the projection 48 is inserted into the recess 45. With the projection 48 disposed inside the recess 45, the slot 24 is formed by an internal surface 53 of the projection 48 and the internal surface of the stator core 10 defining the slot main hole 46.

Figure 11:
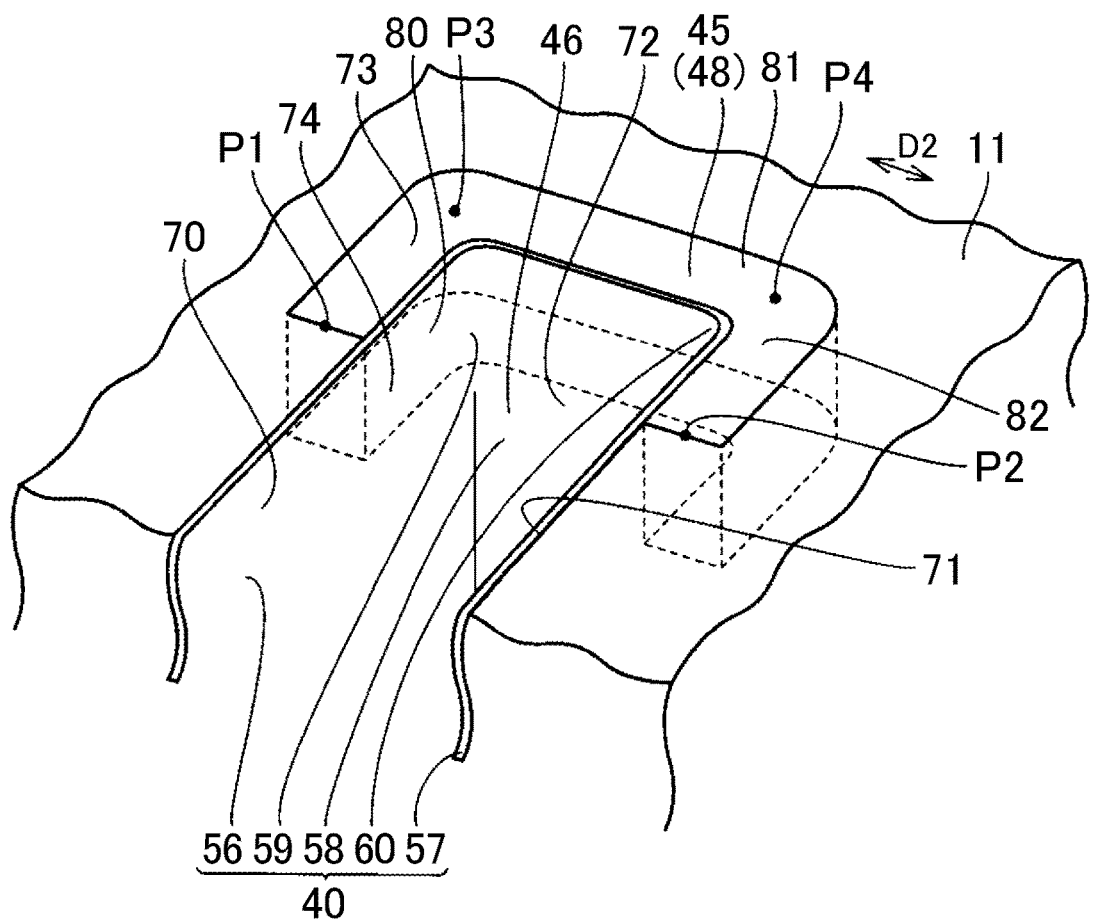
FIG. 11 is a sectional perspective view, and is a sectional view of the end face 11, showing the insulation paper 40, the projection 48, and the surrounding structure.

FIG. 11 is a sectional perspective view, and is a sectional view of the end face 11, showing the insulation paper 40, the projection 48, and the surrounding structure.

As shown in FIG. 11, the insulation paper 40 includes the side wall 56 extending along the inner surface 70, the side wall 57 extending along the inner surface 71, and the bottom wall 58 extending along the bottom surface 72. The end-side portion of the insulation paper 40 as shown in FIG. 2 is not shown in FIG. 11.

The insulation paper 40 includes a connection part 59 connecting the side wall 56 and the bottom wall 58 to each other, and a connection part 60 connecting the side wall 57 and the bottom wall 58 to each other. The connection part 59 and the connection part 60 are formed so as to be curved or bent.

Here, the recess 45 is formed such that the internal surface of the stator core 10 is apart from the connection parts 59, 60 of the insulation paper 40. Specifically, the recess 45 is formed so as to extend from a first adjacent position P1 adjacent to the side wall 56 of the insulation paper 40, pass through a position P3 adjacent to the connection part 59 and a position P4 adjacent to the connection part 60, and reach a second adjacent position P2 adjacent to the side wall 57. The distance from the first adjacent position P1 to the position P3 is smaller than the width of the slot 24 in the circumferential direction D2, and the distance from the second adjacent position P2 to the position P4 is smaller than the width of the slot 24 in the circumferential direction D2.

The projection 48 is disposed inside the recess 45, and is formed so as to extend from the first adjacent position P1 to the second adjacent position P2 of the recess 45. The projection 48 includes a side wall 80 supporting the side wall 56 of the insulation paper 40, a bottom wall 81 supporting the bottom wall 58 of the insulation paper 40, and a side wall 82 supporting the side wall 57.

Figure 12:
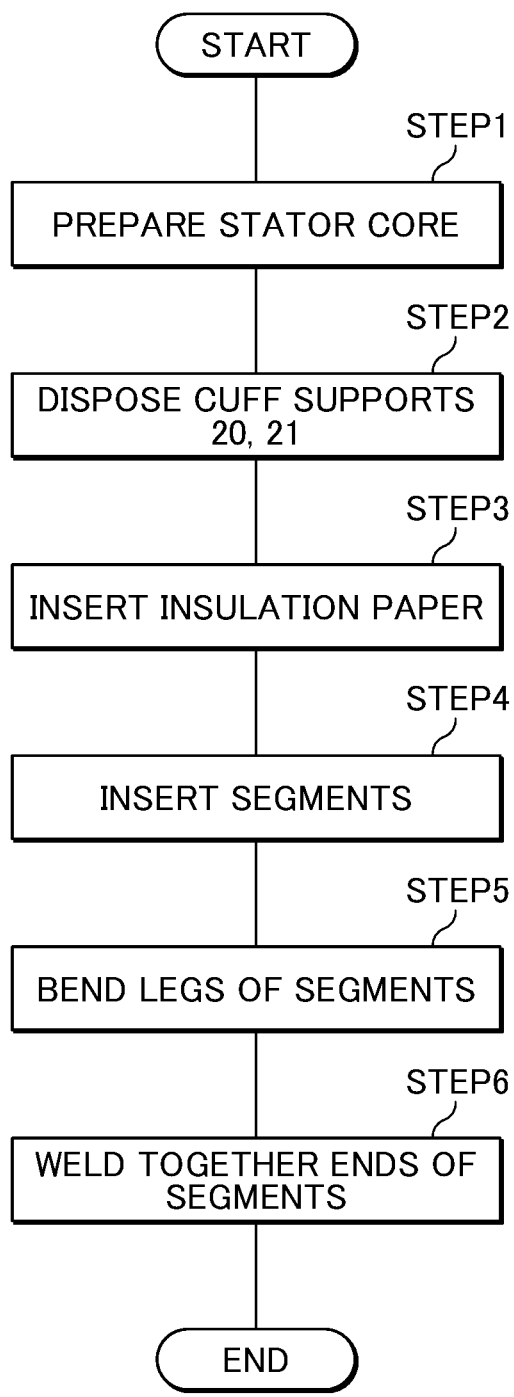
FIG. 12 is a process flowchart showing the manufacturing process of the stator 4.

FIG. 12 is a process flowchart showing the manufacturing process of the stator 4. As shown in FIG. 12, the stator core 10 is prepared (step 1). The step of preparing the stator core 10 includes the step of stacking the plurality of laminated steel plates and the step of caulking and integrating the laminated steel plates.

Figure 13:
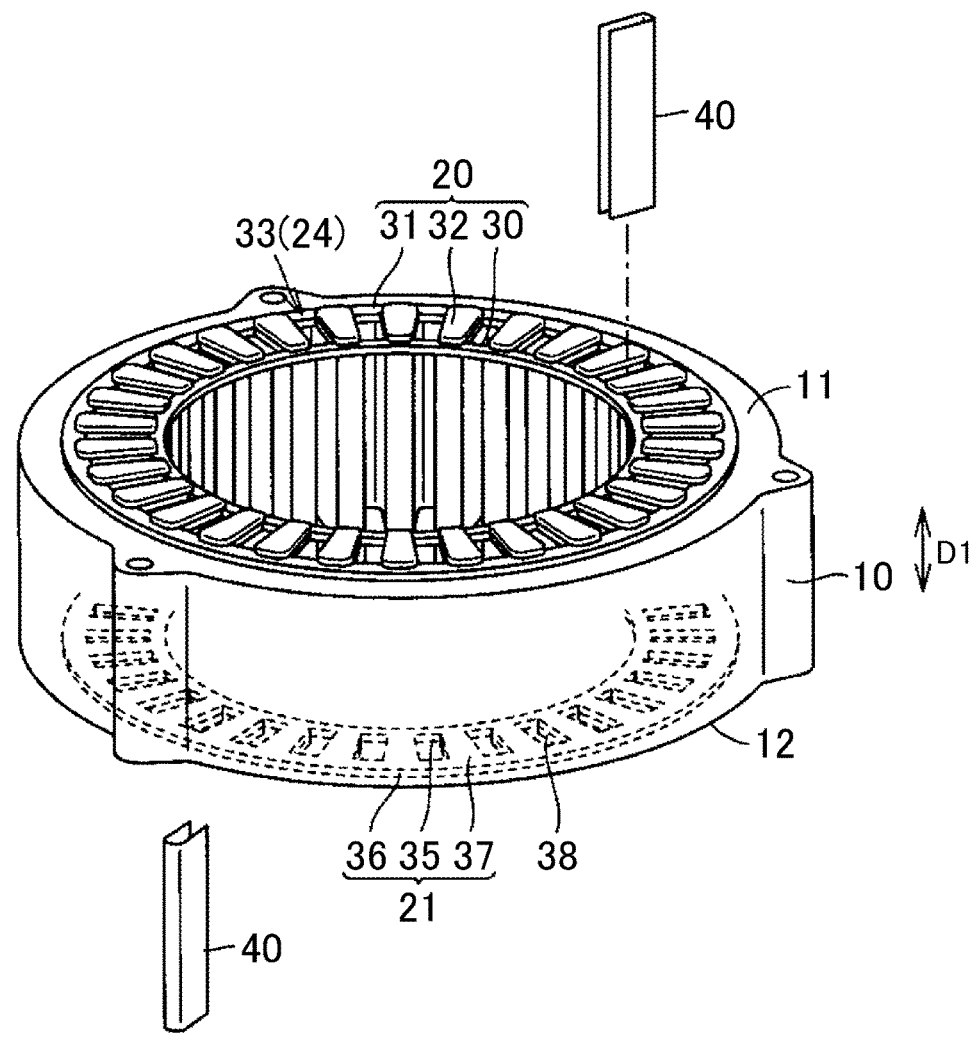
FIG. 13 is a perspective view schematically showing step 2 to step 4 shown in FIG. 12.
Figure 13:
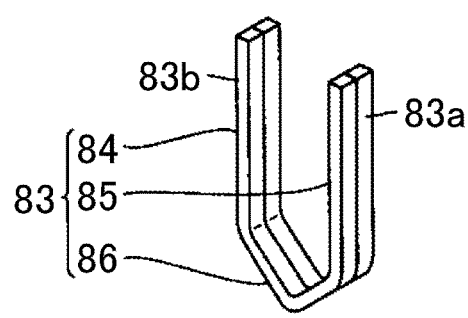

FIG. 13 is a perspective view schematically showing step 2 to step 4 shown in FIG. 12. As shown in FIG. 13 and FIG. 12, the cuff support 20 and the cuff support 21 are disposed respectively on the end face 11 and the end face 12 of the stator core 10 (step 2).

Next, the insulation paper 40 is inserted into the communication holes 33, the slots 24, and the communication holes 38 (step 3). Next, a plurality of segments 83 are inserted into the stator core 10 from below the stator core 10 (step 4).

As shown in FIG. 13, the segment 83 includes a pair of legs 84, 85, and a curved part 86 connecting the end of the leg 84 and the end of the leg 85 to each other.

Figure 14:
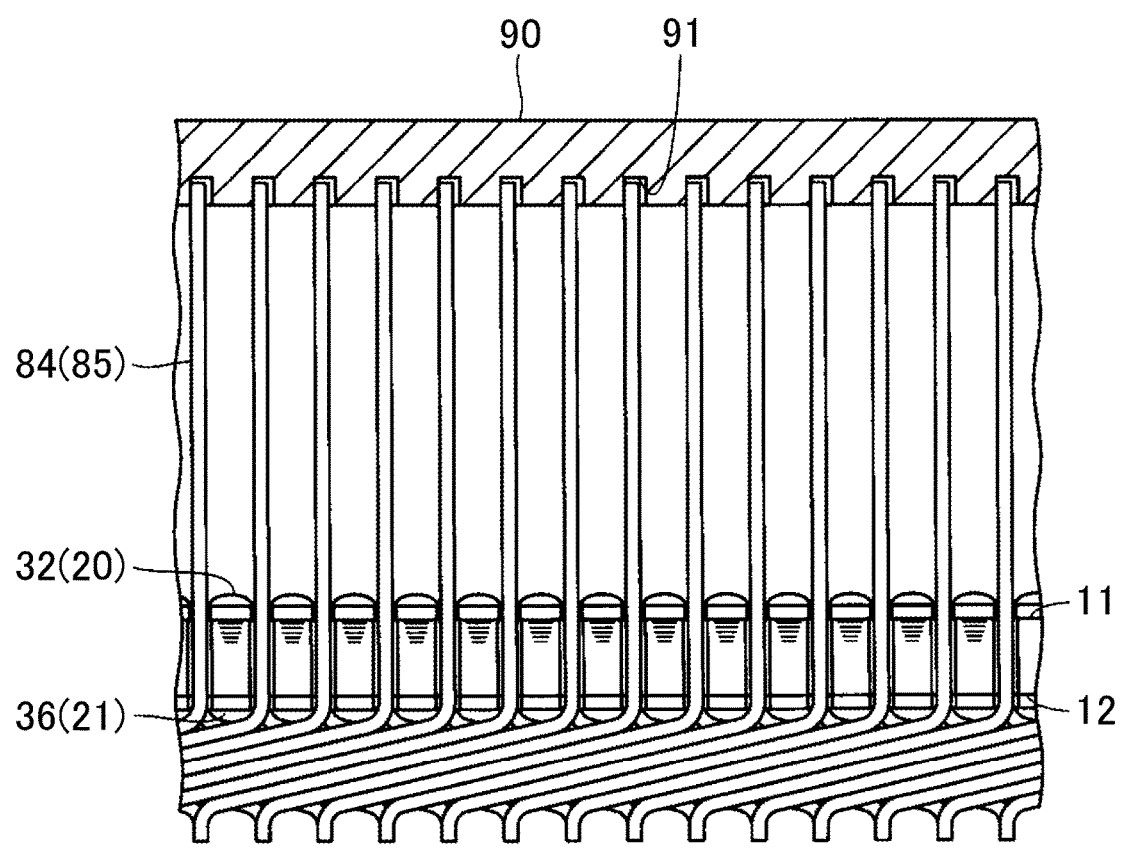
FIG. 14 is a development showing a plurality of segments 83 as inserted in the slots 24 etc.

FIG. 14 is a development showing the plurality of segments 83 as inserted in the slots 24 etc. As shown in FIG. 14, the legs 84, 85 of each segment 83 protrude to a great extent from the end face 11.

Figure 15:
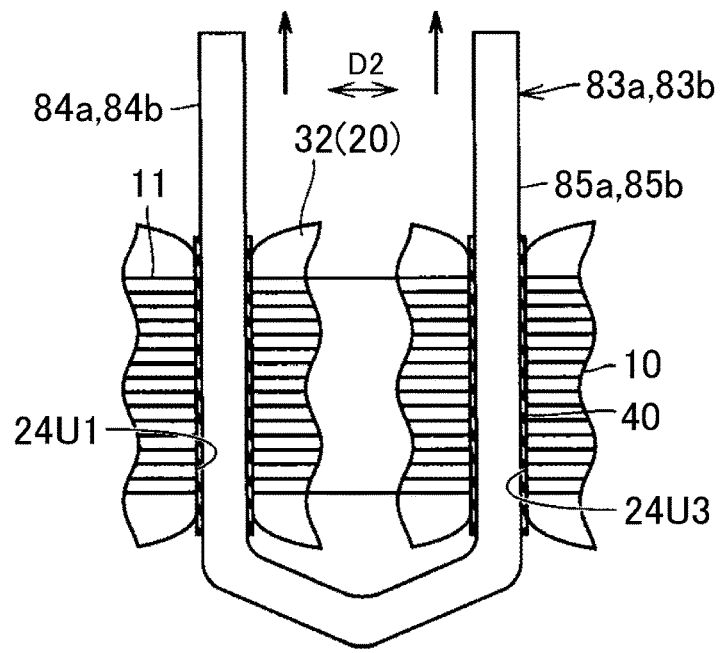
FIG. 15 is a development schematically showing the step shown in FIG. 14.

FIG. 15 is a development schematically showing the step shown in FIG. 14. In FIG. 15, segments 83a, 83b shown in FIG. 13 are inserted in the slots 24U1, 24U3. The segment 83a is disposed on the near side in FIG. 15 (on the radially inner side of the stator core 10), while the segment 83b is disposed on the rear side of the segment 83a (on the radially outer side of the stator core 10).

Specifically, legs 84a, 84b of the segments 83a, 83b are inserted in the slot 24U1, while legs 85a, 85b of the segments 83a, 83b are inserted in the slot 24U3.

Next, the legs 84, 85 of the segments 83 are bent (step 5). The step of bending the legs 84, 85 of the segments 83 includes the step of preparing a die 90, which holds the upper ends of the legs 84, 85, as shown in FIG. 14, and the step of driving the die 90 to rotate spirally while the die 90 holds the upper ends of the legs 84, 85 as shown in FIG. 16.

The die 90 shown in FIG. 14 and FIG. 15 has a ring shape. Since the inner peripheral surface of the stator 4 is shown in a developed state in FIG. 14 and FIG. 15, the die 90 is shown as having a rectangular shape in FIG. 14 and FIG. 15. The die 90 has a plurality of recesses 91 into which the upper ends of the legs 84, 85 are inserted. Thus, the upper ends of the legs 84, 85 are inserted into the recess 91.

Figure 16:
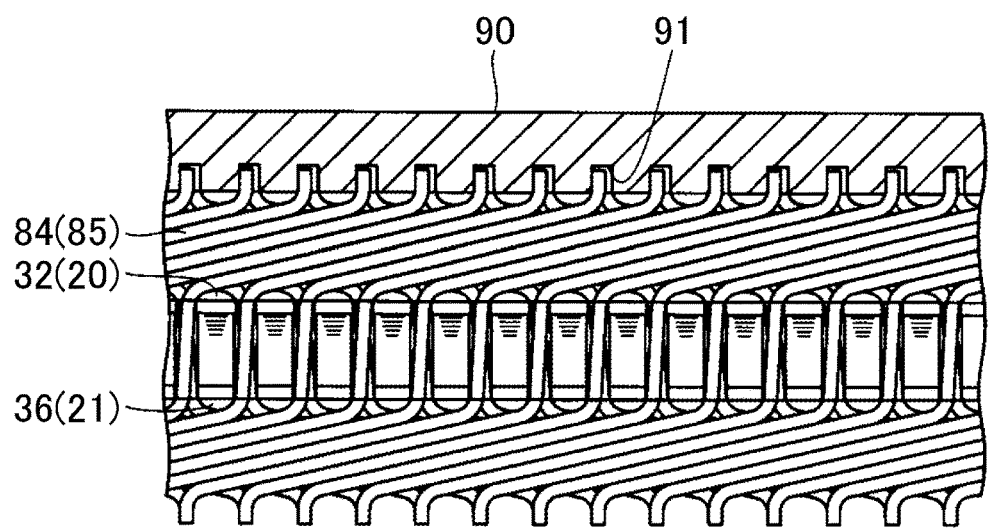
FIG. 16 is a development showing the step of bending legs of the segments 83.

Next, as shown in FIG. 16, with the stator core 10 fixed, the die 90 is driven so as to approach the stator core 10 while rotating. As a result, the leg 84 and the leg 85 of each segment 83 are bent.

Figure 17:
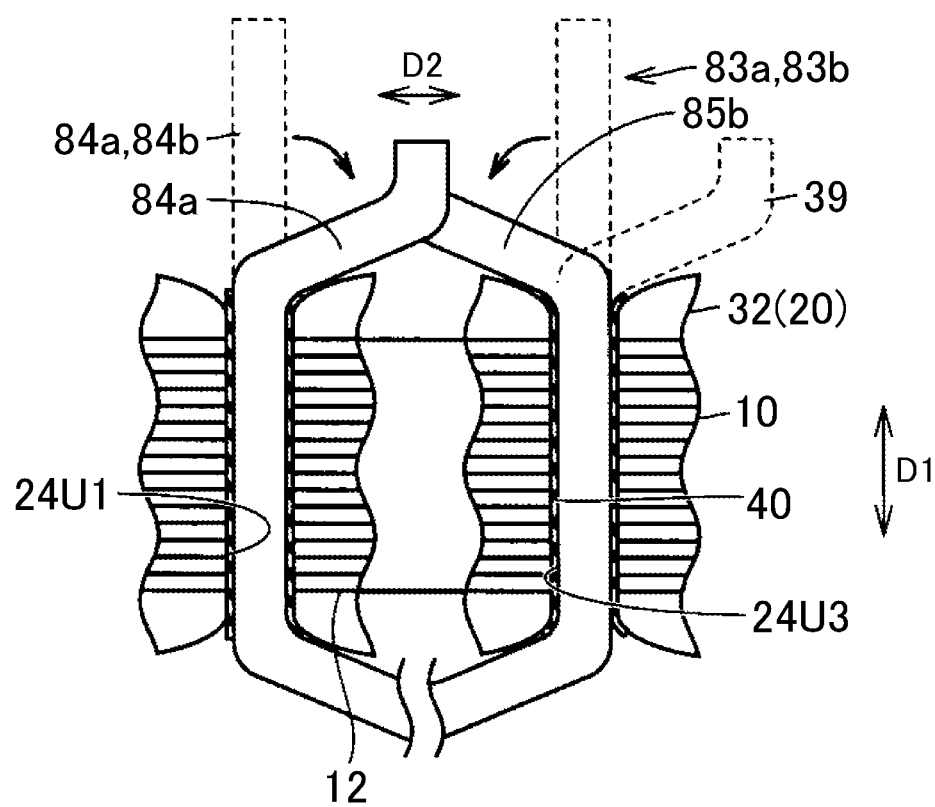
FIG. 17 is a view schematically showing the step shown in FIG. 16.

FIG. 17 is a view schematically showing the step shown in FIG. 16. As shown in FIG. 17, the leg 84a of the segment 83a and the leg 85b of the segment 83b are bent in the circumferential direction D2 such that the leg 84a and the leg 85b approach each other. Then, the leading end of the leg 84a and the leading end of the leg 85b are welded together. Thus, a coil wound once between the slot 24U1 and the slot 24U3 is formed.

Then, the plurality of segments are inserted into the slot 24U1 and the slot 24U3 and each segment is connected to another segment as shown in FIG. 17, and thus a coil would multiple times between the slot 24U1 and the slot 24U3 can be formed.

In the slot 24U5 and the slot 24U7 of FIG. 1, too, a coil wound multiple times between the slot 24U5 and the slot 24U7 is formed in the same manner.

In the bending step shown in FIG. 16, the segment disposed on the radially outermost side or on the radially innermost side among the plurality of segments inserted into the slots 24U1, 24U3 and the segment disposed on the radially outermost side or on the radially innermost side among the plurality of segments disposed in the slots 24U5, 24U7 are connected to each other. Thus, a crossover wire 39 indicated by the broken line in FIG. 17 is formed. The coil formed in the slots 24U1, 24U3 and the coil formed in the slots 24U5, 24U7 are connected to each other through the crossover wire 39.

In this way, the U-phase coil U1 is formed. In the same manner, the U-phase coil U2, the V-phase coils V1, V2, and the W-phase coils W1, W2 are formed, and thus the rotating electrical machine 1 shown in FIG. 1 can be formed.

Figure 18:
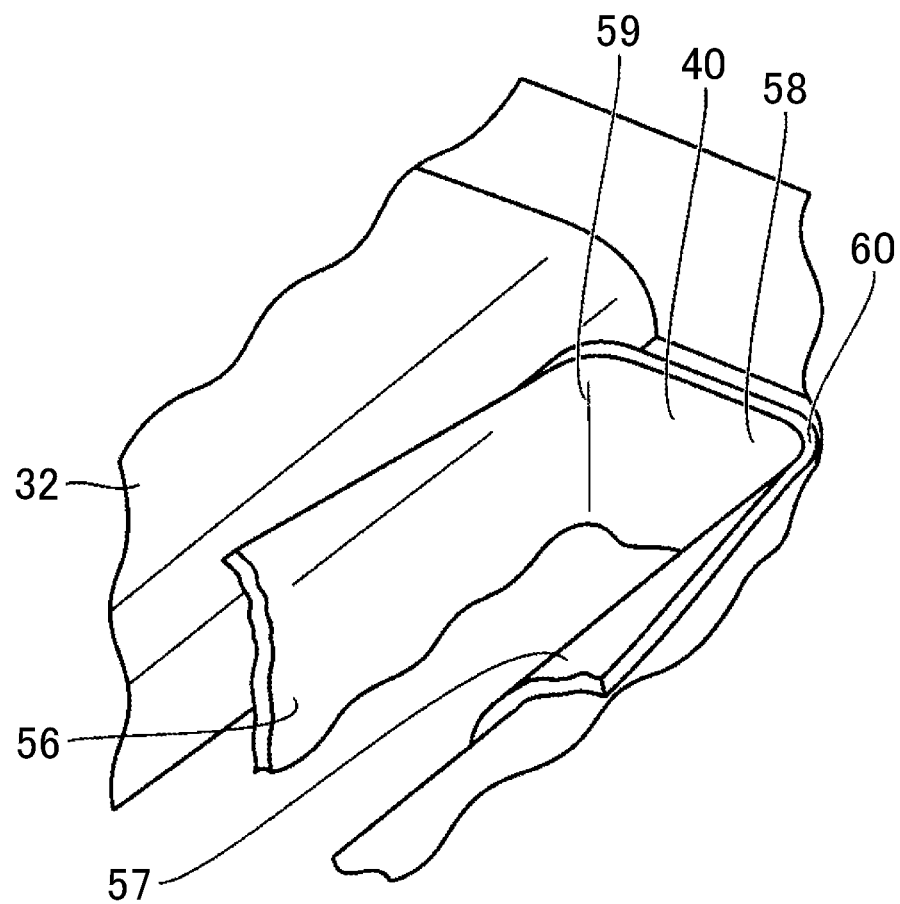
FIG. 18 is a perspective view showing the insulation paper 40 and the surrounding structure after the segment bending step shown in FIG. 17 has been performed.

FIG. 18 is a perspective view showing the insulation paper 40 and the surrounding structure after the segment bending step shown in FIG. 17 has been performed. In FIG. 18, the stator coil 9 is omitted.

As shown in FIG. 18, when the U-phase coil U1 and the crossover wire 39 shown in FIG. 17 are formed, the upper ends of the side walls 56, 57 of the insulation paper 40 are bent. As a result, the upper ends of the side walls 56, 57 are curved along the upper surface of the cover 32.

Figure 19:
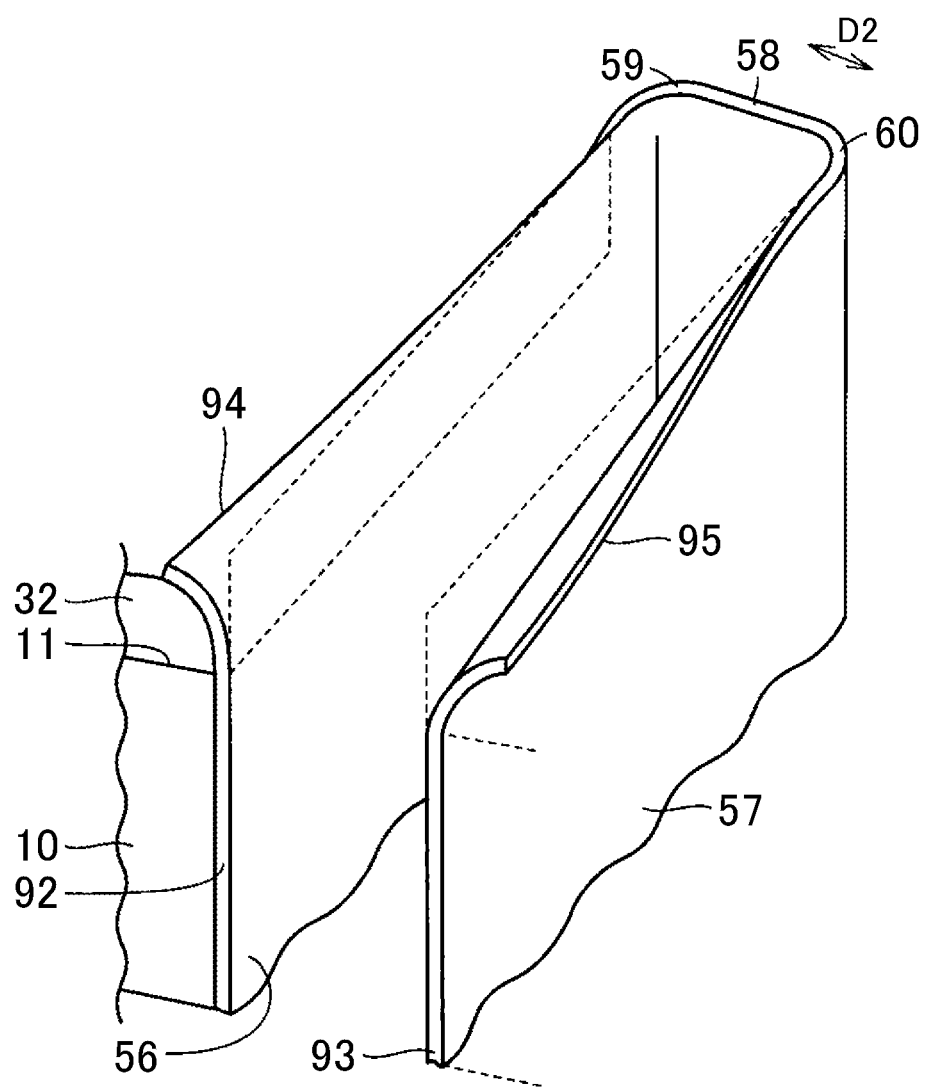
FIG. 19 is a perspective view showing the insulation paper 40.

As shown in FIG. 19, the upper ends of the side wall 56 and the side wall 57 are bent in the circumferential direction D2, while the bottom wall 58 is disposed along the circumferential direction D2 and deforms little in the circumferential direction D2. Accordingly, an end side 94 and the surrounding part of the side wall 56 become more difficult to bend in the circumferential direction D2 from an inner end side 92 toward the connection part 59. Similarly, an end side 95 and the surrounding part of the side wall 57 become more difficult to bend in the circumferential direction D2 from an inner end side 93 toward the connection part 60. The connection part 59 is one example of the first connection part, and the connection part 60 is one example of the second connection part.

Accordingly, the insulation paper 40 may tear in the connection parts 59, 60 or in the vicinity thereof while the coils of each phases and the crossover wires are formed.

Figure 20:
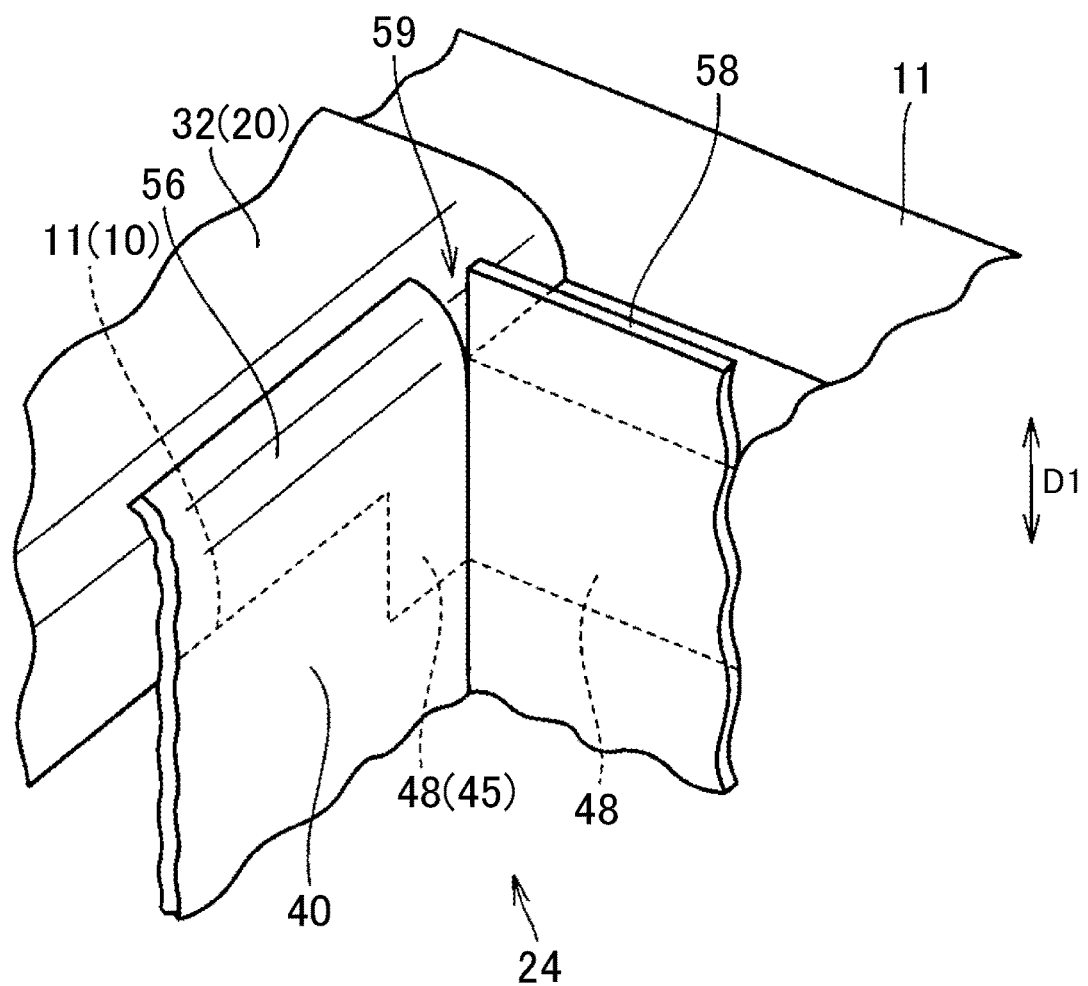
FIG. 20 is a perspective view showing the insulation paper 40 torn at the upper end of a connection part 59.

Here, FIG. 20 is a perspective view showing the insulation paper 40 torn at the upper end of the connection part 59. Since the upper end of the connection part 59 is provided at a position protruding to the outside from the end face 11 of the stator core 10, when the upper end of the connection part 59 starts to tear, first, the cover 32 of the cuff support 20 is exposed through the insulation paper 40. Once the connection part 59 starts to tear, the tear grows easily. As a result, the tear having occurred at the upper end of the connection part 59 can reach the slot 24.

In the stator 4 according to the first embodiment, the recess 45 is formed in the stator core 10 at a position adjacent to the connection part 59, and the recess 45 is formed so as to extend from the end face 11 in the thickness direction D1. The projection 48 of the cuff support 20 is disposed inside the recess 45. Thus, even if the tear in the connection part 59 reaches inside the slot 24, the projection 48 is exposed and the exposure of the stator core 10 through the insulation paper 40 is prevented.

In particular, the internal surface of the projection 48 extends from the end face 11 in the thickness direction D1. Therefore, in the segment bending step, the portion of the insulation paper 40 located further on the upper side than the end face 11 is bent, while the portions of the side wall 56 and the connection part 59 adjacent to the projection 48 are prevented from bending.

As a result, even if the upper end of the connection part 59 of the insulation paper 40 tears, the tear is prevented from growing beyond the projection 48, so that the exposure of the stator core 10 through the insulation paper 40 can be prevented.

Similarly, even if a tear occurs in the connection part 60 of the insulation paper 40, the projection 48 provided at the position adjacent to the connection part 60 prevents the exposure of the internal surface of the stator core 10.

In the step of bending the legs 84a, 84b, 85a, 85b of the segments 83a, 83b, an internal stress in the tensile direction may act on the connection part 59 and the connection part 60 despite there being no tear in the insulation paper 40. Accordingly, the insulation paper 40 may tear in the connection parts 59, 60 when the insulation paper 40 has deteriorated with time, but in that case, too, the exposure of the stator core 10 through the insulation paper 40 can be prevented.

As shown in FIG. 16 and FIG. 17, the upper surface of the cover 32 has a curved shape. Therefore, when the legs 84a, 84b, 85a, 85b of the segments 83a, 83b are bent, the legs 84a, 84b, 85a, 85b of the segments 83a, 83b are curved along the upper surface of the cover 32. Accordingly, the upper ends and the part in the vicinity thereof of the side wall 56 and the side wall 57 of the insulation paper 40 are also curved along the upper surface of the cover 32.

Therefore, the side walls 56, 57 and the part in the vicinity thereof of the insulation paper 40 are prevented from being bent at an acute angle, so that the occurrence of a large tear in the connection parts 59, 60 of the insulation paper 40 can be prevented.

Thus, the occurrence of a tear in the connection parts 59, 60 of the insulation paper 40 is prevented, and even if a tear does occurs in the connection parts 59, 60, insulation between the stator coil 9 and the stator core 10 is secured.

As shown in FIG. 9 etc., the projection 48 of the cuff support 20 is fitted in the recess 45, so that the displacement of the cuff support 20 from the stator core 10 is prevented. Thus, the displacement of the cuff support 20 can be prevented while the legs 84a, 84b, 85a, 85b of the segments 83a, 83b are bent as shown in FIG. 17, and even when the legs 84a, 84b, 85a, 85b of the segments 83a, 83b are bent so as to be pressed against the upper surface of the cover 32, the displacement of the cuff support 20 can be prevented. Accordingly, it is possible to apply a large load to the legs 84a, 84b, 85a, 85b of the segments 83a, 83b when bending the legs 84a, 84b, 85a, 85b of the segments 83a, 83b, and thus to complete the processing of the segments 83a, 83b in a short time.

Here, if the projection 48 shown in FIG. 20 is not provided, it is necessary to prevent the insulation paper 40 from tearing in the connection part 59. Therefore, when bending the legs 84a, 84b, 85a, 85b of the segments 83a, 83b, it is necessary to bend the legs 84a, 84b, 85a, 85b at a position away from the upper surface of the cover 32 in FIG. 17 so as to prevent the bending of the side walls 56, 57 of the insulation paper 40.

However, thus bending the legs 84a, 84b, 85a, 85b at a position away from the cover 32 is likely to result in an increase of the stator coil 9 in length in the thickness direction D1 and an increase in size of the rotating electrical machine 1.

On the other hand, the rotating electrical machine 1 according to the first embodiment is provided with the projection 48 as shown in FIG. 20 etc., which allows insulation between the stator core 10 and the stator coil 9 to be secured even when the segments 83a, 83b are bent along the upper surface of the cover 32 as shown in FIG. 17. As a result, it is possible to bend the segments 83a, 83b along the cover 32, while downsizing the rotating electrical machine 1 in the thickness direction D1.

Figure 21:
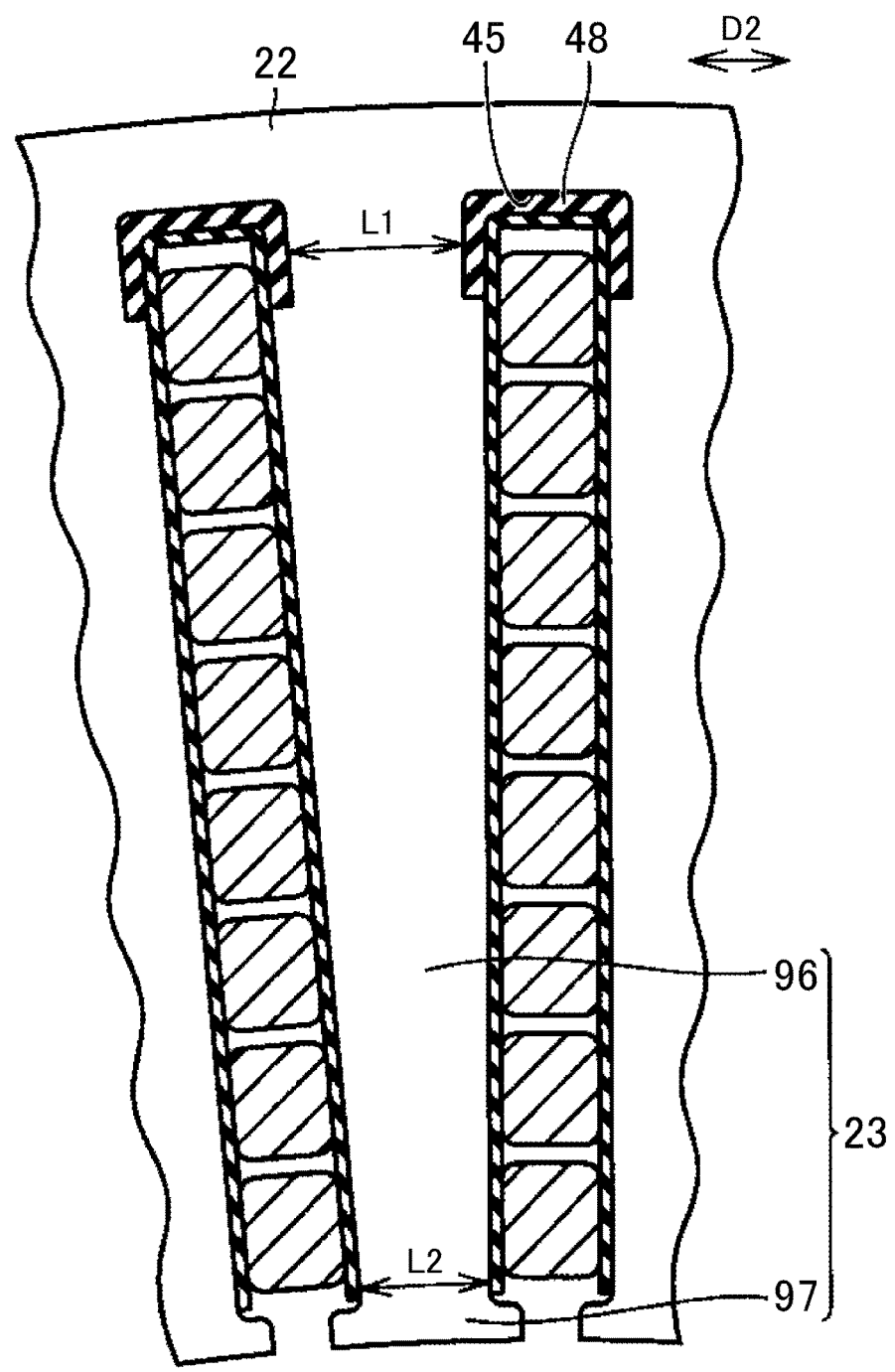
FIG. 21 is a partial sectional view showing stator teeth 23 and the surrounding structure.

Here, FIG. 21 is a partial sectional view showing the stator teeth 23 and the surrounding structure. As shown in FIG. 21, the stator tooth 23 includes a tooth body 96 protruding radially inward from the yoke 22, and a wide part 97 formed at the tip of the tooth body 96. The tooth body 96 is located further on the radially inner side than the recess 45.

The width of the tooth body 96 in the circumferential direction D2 is reduced from the side of the yoke 22 toward the radially inner side. The wide part 97 is wider than a width L2 of the tooth body 96 at the tip. While the rotating electrical machine 1 is being driven, a magnetic flux from the rotor 3 enters the wide part 97 and passes through the inside of the stator tooth 23 to reach the yoke 22.

Here, a distance L1 between the recesses 45 adjacent to each other in the circumferential direction D2 is larger than the width L2. Therefore, the sectional area of the stator core 10 as seen in a plane passing through the adjacent recesses 45 in the direction perpendicular to the radial direction of the stator core 10 is larger than the sectional area in the connection part between the tooth body 96 and the wide part 97. As a result, the connection part between the wide part 97 and the tooth body 96 has the highest magnetic resistance in the magnetic route from the wide part 97 to the yoke 22. The magnetic resistance in the magnetic route is prevented from becoming higher by forming the recess 45. In the rotating electrical machine 1 according to the first embodiment, the stator core 10 and the cuff support 20 are engaged with each other by engaging the projection 48 in the recess 45, but a member that engages the cuff support 20 with the stator core 10 may be additionally provided.

Figure 22:
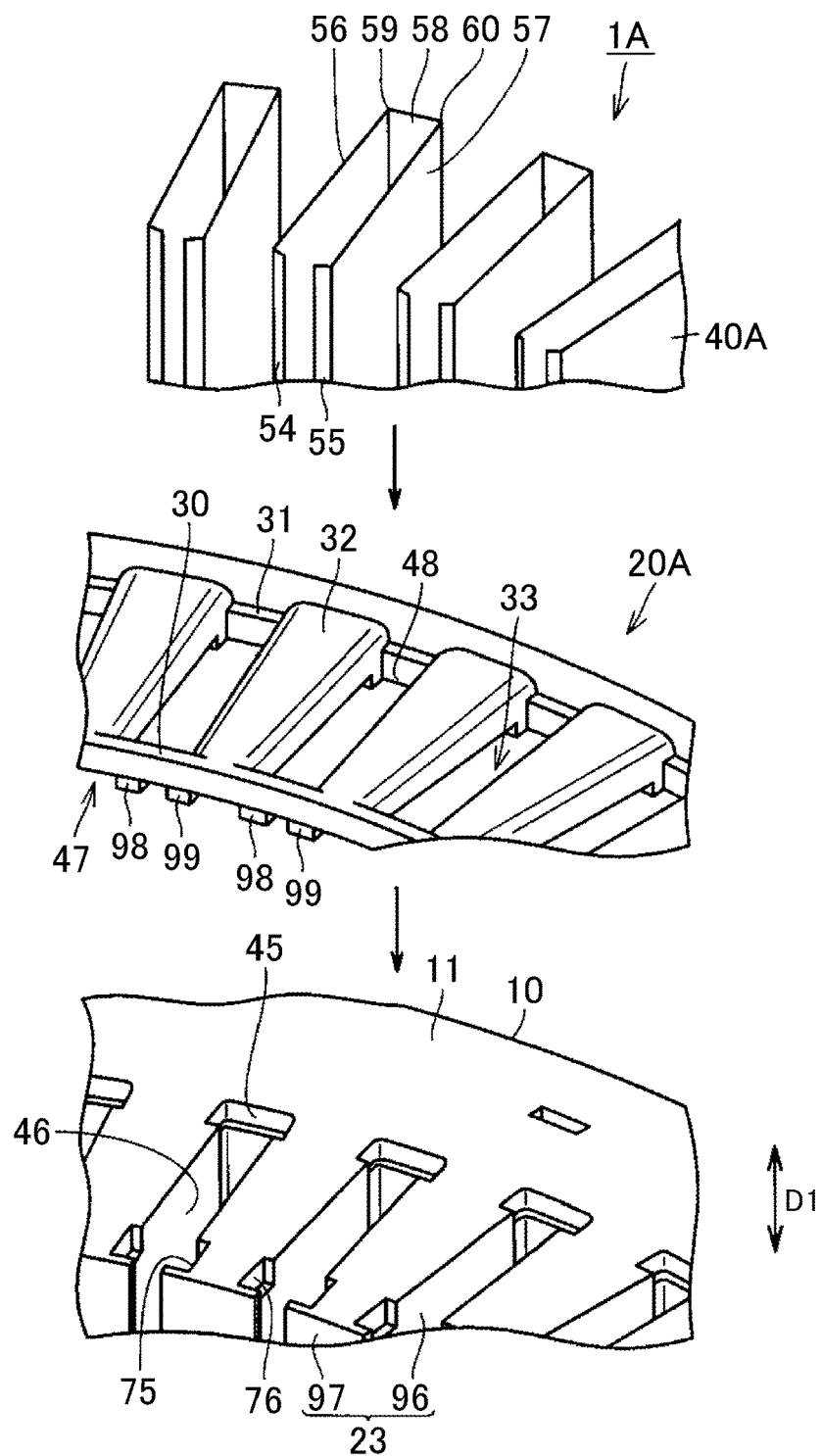
FIG. 22 is an exploded perspective view showing a rotating electrical machine 1A according to the second embodiment.

FIG. 22 is an exploded perspective view showing a rotating electrical machine 1A according to the second embodiment. As shown in FIG. 22, the rotating electrical machine 1A includes the stator core 10, a cuff support 20A disposed on the end face 11 of the stator core 10, and insulation paper 40A. A cuff support (not shown) is disposed on the opposite end face of the stator core 10. The cuff support 20A includes the inner frame 30, the outer frame 31, the covers 32, the projections 48, and projections 98, 99 formed on the mounting surface 47 of the inner frame 30. Recesses 75, 76 are formed in the stator teeth 23 of the stator core 10.

The recess 75 is formed so as to extend from one side surface of the tooth body 96 to the rear surface of the wide part 97. The recess 76 is formed so as to extend from the other side surface of the tooth body 96 to the rear surface of the wide part 97. The recesses 75, 76 are formed so as to extend from the end face 11 in the thickness direction D1. The insulation paper 40A includes the side wall 56, the side wall 57, the bottom wall 58, the connection part 59 connecting the side wall 56 and the bottom wall 58 to each other, and the connection part 60 connecting the side wall 57 and the bottom wall 58 to each other. The insulation paper 40A further includes an inner end piece 54 connected to the inner end side of the side wall 56 and an inner end piece 55 connected to the inner side of the side wall 57.

Figure 23:
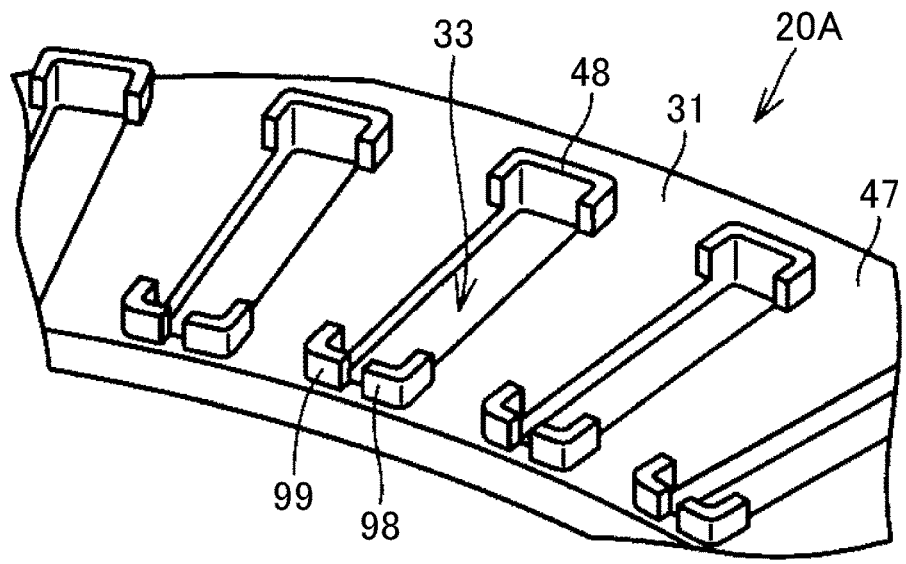
FIG. 23 is a perspective view showing the mounting surface 47 of a cuff support 20A.

FIG. 23 is a perspective view showing the mounting surface 47 of the cuff support 20A. As shown in FIG. 23, the projections 98, 99 are formed at positions adjacent to the communication hole 33 from the radially inner side.

Figure 24:
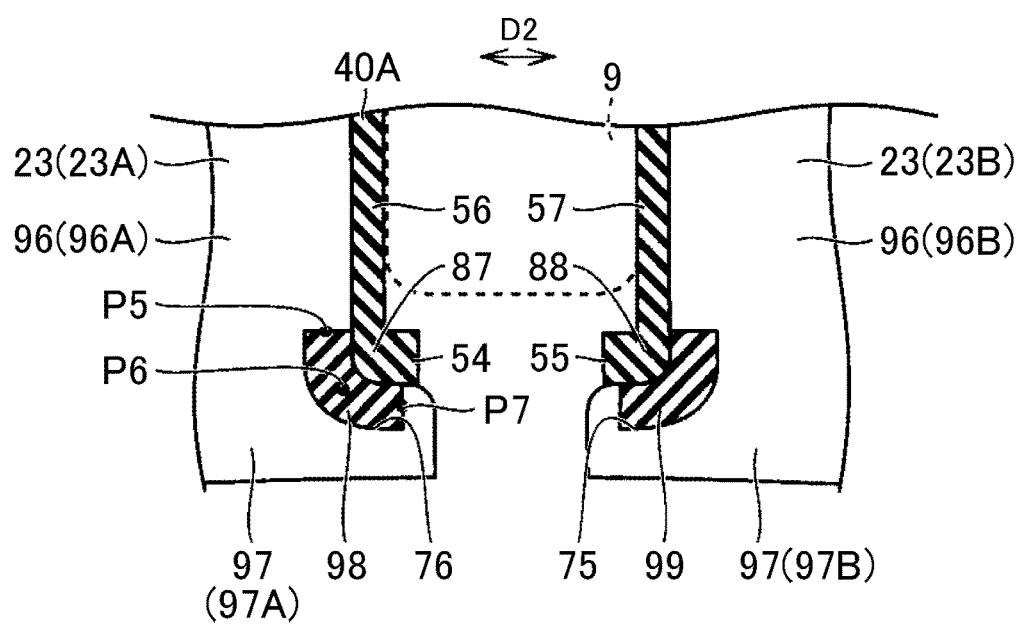
FIG. 24 is a sectional view of the tip side of the stator teeth 23.

FIG. 24 is a sectional view of the tip side of the stator tooth 23. As shown in FIG. 24, the side wall 56 of the insulation paper 40A is disposed along the side surface of a tooth body 96A. The inner end piece 54 is disposed along the rear surface of a wide part 97A. A connection part 87 between the inner end piece 54 and the side wall 56 is bent along the corner formed by the side surface of the tooth body 96A and the rear surface of the wide part 97A. The recess 76 extends from a position P5 adjacent to the side wall 56, passes through a position P6 adjacent to the connection part 87, and reaches a position P7 adjacent to the inner end piece 54. The projection 98 is fitted in the recess 76. Accordingly, the projection 98 is disposed at a position adjacent to the connection part 87. Similarly, the insulation paper 40A includes the side wall 57, the inner end piece 55, and a connection part 88 between the side wall 57 and the inner end piece 55. The projection 99 is disposed at a position adjacent to the connection part 88.

Thus, in the stator core 10A according to the second embodiment, the projections 48, 98, 99 of the cuff support 20A are engaged with the stator core 10, so that, compared with the stator core 10 according to the first embodiment, the displacement of the cuff support 20A can be further prevented in the manufacturing process of the stator.

In the step of forming the stator coil 9, the upper ends of the side wall 56 and the side wall 57 are bent such that the distance therebetween in the circumferential direction D2 is increased. On the other hand, the inner end piece 54 and the inner end piece 55 are pulled in the circumferential direction D2, but the inner end piece 54 and the inner end piece 55 do not stretch easily in the circumferential direction D2. As a result, a tear may occur at the upper ends of the connection part 87 and the connection part 88. However, the rotating electrical machine 1A according to the second embodiment has the projection 98 and the projection 99 disposed at the positions adjacent to the connection part 87 and the connection part 88. Therefore, even if a tear does occur at the upper ends of the connection part 87 and the connection part 88, the exposure of the stator core 10 is prevented.

Since the projection 48 is also formed in the rotating electrical machine 1A according to the second embodiment, insulation between the stator coil 9 and the stator core 10 can be secured even if the insulation paper 40A tears in the connection parts 59, 60 and the surrounding part.

In the rotating electrical machines 1, 1A according to the first and second embodiment, the projection 48 and the recess 45 formed in the cuff supports 20, 20A are formed so as to extend from the position adjacent to the side wall 56 of the insulation paper 40A, pass through the connection part 59 and the position adjacent to the connection part 59, and reach the position adjacent to the side wall 57 as shown in FIG. 11, but the configuration of the projection 48 and the recess 45 is not limited to this configuration.

Figure 25:
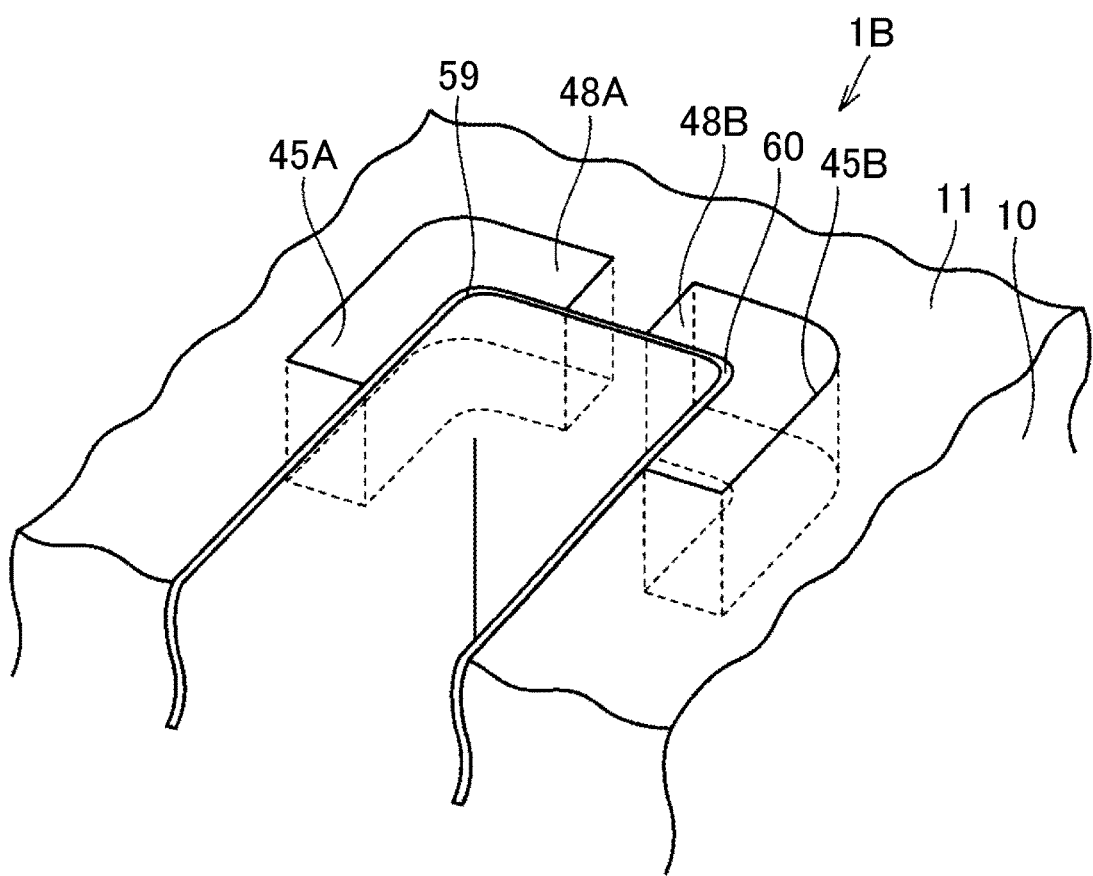
FIG. 25 is a perspective view showing a modified example of the structure of the projection 48 and the recess 45.

FIG. 25 is a perspective view showing a modified example of the structure of the projection 48 and the recess 45. In the example shown in FIG. 25, a recess 45A formed so as to be separated from the connection part 59 and a recess 45B formed so as to be separated from the connection part 60 are formed in the end face 11 of the stator core 10. The recess 45A and the recess 45B are provided with an interval therebetween.

The cuff support 20 includes a projection 48A inserted into the recess 45A and a projection 48B inserted into the recess 45B.

In a rotating electrical machine 1B thus formed, too, insulation between the stator coil 9 and the stator core 10 can be secured even if the insulation paper 40A tears in the connection parts 59, 60 and in the vicinity thereof in the manufacturing process of the rotating electrical machine 1B. In the insulation paper 40A, a cut may be made in advance at the ends of the connection parts 59, 60. Forming such a cut can prevent a large tensile force from being applied to the connection part 59 during the bending process of the segments 83. The cut is formed so as to extend from the end of the connection part 59 and not to reach the slot 24.

In the first and second embodiment, the distributed-winding stator has been described, but the present disclosure is also applicable to concentrated-winding stators. The cuff support 20 and the cuff support 21 may be split into a plurality of parts in the circumferential direction. For example, the cuff supports may be split at positions between the covers 32, 37 adjacent to each other in the circumferential direction. Moreover, a split stator core may be adopted as the stator core. In the case where the present disclosure is applied to a split stator core, the cuff support 20 and the cuff support 21 are split in the same manner as the split stator core. Furthermore, in the first and second embodiment, the inner-rotor rotating electrical machine with the stator teeth 23 formed on the inner peripheral surface of the yoke 22 has been described, but the present disclosure is also applicable to outer-rotor rotating electrical machines with the stator teeth 23 formed on the outer peripheral surface of the yoke 22.

While the embodiments based on the present disclosure have been described above, these embodiments disclosed herein are not limitative but illustrative in every aspect. The technical scope of the present disclosure is defined by the claims, and is intended to include any changes within a scope equivalent in meaning to the claims.

The present disclosure can be applied to stators.

What is claimed is:

1. A stator comprising:
    a stator core including a yoke that extends annularly, and a plurality of stator teeth that is arranged on a peripheral surface of the yoke at intervals in a circumferential direction of the yoke, the stator core being annular and having slots, the slots being each provided between the stator teeth adjacent to each other in the circumferential direction of the stator core;
    a pair of insulation members, the pair of insulation members including a first insulation member disposed on the stator teeth at one end face of a pair of end faces of the stator core and a second insulation member disposed on the stator teeth at another end face of the pair of end faces, the pair of end faces are aligned with each other in a thickness direction of the stator core;
    a coil disposed in the slots, the coil protruding to the outside of the stator core through an opening of the slot located in the one end face;
    insulation paper disposed in the slot between the coil and the stator core, the insulation paper including side walls extending along the stator teeth, and the insulation paper including a bottom wall, the bottom wall extending along the peripheral surface of the yoke and being connected to the side walls, the insulation paper being provided so as to protrude through the opening of the slot, wherein
    an internal surface of the stator core defining the slot has a recess at a position adjacent to connection parts between the side walls and the bottom wall of the insulation paper, the internal surface of the stator core defining the recess is apart from the connection parts, and the recess extends from the one end face in the thickness direction, and the first insulation member includes a projection that is configured to be disposed inside the recess;
    the side walls include a first side wall extending along one of two stator teeth that are adjacent to each other in the circumferential direction, and a second side wall extending along the other of the stator teeth,
    the connection parts include a first connection part connecting the first side wall and the bottom wall to each other, and a second connection part connecting the second side wall and the bottom wall to each other,
    the recess is provided so as to extend from a first adjacent position adjacent to the first side wall, pass through a position adjacent to the first connection part and a position adjacent to the second connection part, and reach a second adjacent position adjacent to the second side wall, and
    the projection is configured to extend from the first adjacent position to the second adjacent position.
2. The stator according to claim 1, wherein the stator teeth each further includes tip recesses that are formed on a radially inner side of the stator core than the recess, and the first insulation member includes tip projections so as to be disposed inside the tip recesses.

* * * * *